United States Patent
Zhang et al.

(10) Patent No.: US 10,588,015 B2
(45) Date of Patent: Mar. 10, 2020

(54) TERMINAL AUTHENTICATING METHOD, APPARATUS, AND SYSTEM

(71) Applicant: Huawei Technologies Co., Ltd., Shenzhen (CN)

(72) Inventors: Bo Zhang, Shenzhen (CN); Chengdong He, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 406 days.

(21) Appl. No.: 15/197,381

(22) Filed: Jun. 29, 2016

(65) Prior Publication Data
US 2016/0309328 A1    Oct. 20, 2016

Related U.S. Application Data
(63) Continuation of application No. PCT/CN2014/080713, filed on Jun. 25, 2014.

(30) Foreign Application Priority Data

Dec. 31, 2013   (CN) .......................... 2013 1 0753800

(51) Int. Cl.
*G06F 7/04*     (2006.01)
*G06F 15/16*    (2006.01)
(Continued)

(52) U.S. Cl.
CPC .................................. *H04W 12/06* (2013.01)

(58) Field of Classification Search
CPC ................................. H04W 12/06; H04L 9/00
See application file for complete search history.

(56) References Cited

U.S. PATENT DOCUMENTS 8,107,962 B2 * 1/2012 Parmar ............. H04W 36/0011
                                                     455/437
10,243,644 B2 * 3/2019 Xu ........................ H04W 24/02
(Continued)

FOREIGN PATENT DOCUMENTS

CN    101931955 A   12/2010
CN    101977378 A    2/2011
(Continued)

OTHER PUBLICATIONS

"Hien Thi Thu Truong, Xiang Gao, Babins Shrestha, Nitesh Saxena, N. Asokan, Petteri Nurmi, Comparing and fusing different sensor modalities for relay attack resistance in Zero-Interaction Authentication, Mar. 24-28, 2014, IEEE, INSPEC#14300118" (Year: 2014).*
(Continued)

*Primary Examiner* — Phy Anh T Vu
(74) *Attorney, Agent, or Firm* — Leydig, Voit & Mayer, Ltd.

(57) ABSTRACT

Embodiments of the present invention disclose a terminal authenticating method, including: receiving, by a UE-to-network relay UE-R, a first request message sent by user equipment UE; sending, by the UE-R, a second request message to a control network element according to the first request message sent by the UE; receiving, by the UE-R, an authentication request message sent by the control network element, and determining whether the authentication request message is for authenticating on the UE; if the authentication request message is for authenticating on the UE, sending, by the UE-R, an authentication request message to the UE; and receiving, by the UE-R, an authentication response message sent by the UE according to the authentication request message, and sending the authentication response message to the control network element.

6 Claims, 16 Drawing Sheets

(51) Int. Cl.
*G06F 17/30* (2006.01)
*H04L 29/06* (2006.01)
*H04W 12/06* (2009.01)

(56) References Cited

U.S. PATENT DOCUMENTS

| | | | |
|---|---|---|---|
| 2007/0124642 A1* | 5/2007 | Suh | H04L 1/1867 714/749 |
| 2007/0209059 A1* | 9/2007 | Moore | H04L 63/0853 726/2 |
| 2007/0280482 A1* | 12/2007 | Yan | H04L 9/083 380/278 |
| 2008/0020789 A1* | 1/2008 | Yan | H04L 63/08 455/466 |
| 2008/0221988 A1* | 9/2008 | Bappu | G06Q 30/0239 705/14.39 |
| 2009/0025079 A1* | 1/2009 | Tanizawa | H04L 63/08 726/14 |
| 2012/0002592 A1* | 1/2012 | Yang | H04B 7/155 370/315 |
| 2012/0263096 A1* | 10/2012 | Masini | H04W 36/10 370/315 |
| 2014/0094145 A1 | 4/2014 | Takahashi et al. | |
| 2015/0026787 A1 | 1/2015 | Zhang et al. | |

FOREIGN PATENT DOCUMENTS

| | | |
|---|---|---|
| CN | 103379490 A | 10/2013 |
| EP | 2365673 A2 | 9/2011 |
| EP | 2365673 A3 | 11/2011 |
| WO | WO 2012137643 A1 | 10/2012 |

OTHER PUBLICATIONS

"Zaher Haddad, Ahmad Alsharif, Ahmed Sherif, Mohamed Mahmoud, Privacy-Preserving Intra-MME Group Handover via MRN in LTE-A Networks for Repeated Trips, Sep. 24-27, 2017, IEEE, INSPEC#17579156" (Year: 2017).*
"Update to Solution R7 (UE-to-Network Relay)", 3GPP SA WG2 Meeting #99, Xiamen, P.R. China, S2-133461, pp. 1-11, $3^{rd}$ Generation Partnership Project, Valbonne, France (Sep. 23-27, 2013).
"Propose pCR to Add Symmetric Key Based Solution to the MTC TS," 3GPP TSG SA WG3 (Security) Meeting #73, San Francisco, California, S3-131091, $3^{rd}$ Generation Partnership Project, Valbonne, France (Nov. 11-15, 2013).
"Security for ProSe Communication Through UE-to-Network Relay with Network Authorization," 3GPP TSG SA WG3 (Security) Meeting #73, San Francisco, California, S3-131147, $3^{rd}$ Generation Partnership Project, Valbonne, France (Nov. 11-15, 2013).
"$3^{rd}$ Generation Partnership Project; Technical Specification Group Services and System Aspects Study on Security Issues to Support Proximity Services (Release 12)," 3GPP TR 33. Cde, V0.3.0, pp. 1-59, $3^{rd}$ Generation Partnership Project, Valbonne, France (Dec. 2013).

* cited by examiner

TERMINAL AUTHENTICATING METHOD, APPARATUS, AND SYSTEM

CROSS-REFERENCE TO RELATED APPLICATIONS

This application is a continuation of International Application No. PCT/CN2014/080713, filed on Jun. 25, 2014, which claims priority to Chinese Patent Application No. 201310753800.6, filed on Dec. 31, 2013, both of which are hereby incorporated by reference in their entireties.

TECHNICAL FIELD

Embodiments of the present invention relates to the field of communications technologies, and in particular, to a terminal authenticating method, apparatus, and system.

BACKGROUND

A short-distance communication service (Proximity Service, ProSe) technology is mainly: establishing a secure communications channel between two user terminals (User Equipment, UE) that are at a relatively short distance from each other, so that data can be securely exchanged when the two UEs perform end-to-end data transmission. The ProSe technology mainly includes two parts: ProSe Discovery and ProSe Communication. In a ProSe Discovery phase, the foregoing two UEs need to detect each other by using an evolved universal terrestrial radio access network (E-UTRAN) or another non-network node technology to implement authentication on identities of both parties. In a ProSe Communication phase, the foregoing two UEs need to establish a secure communications channel by using the E-UTRAN or another non-network node technology, and secure data communication may be performed after the secure communications channel is established. In specific application of the ProSe technology, UE may access an evolved packet core network (EPC) by using a UE-to-network relay (UE-R). In some specific application scenarios, the UE may not be covered by an EPC network signal, but the UE-R is covered by an EPC network signal. In this case, the UE may access the EPC network by using the UE-R. In the foregoing scenario, the UE may access the EPC network by using the UE-R, and there may be a security threat that unauthorized UE accesses the network during access to the EPC network by UE. Therefore, a corresponding safety measure is required to prevent the unauthorized UE from accessing the network.

In the prior art, an Authentication, Authorization and Accounting (AAA) server (a home subscriber server) and the UE-R are used to complete authentication between remote UE and a network by using an Extensible Authentication Protocol-Authentication and Key Agreement (EAP-AKA) authentication protocol. In the prior art, the EAP-AKA protocol is used to perform authentication on the UE, and therefore the UE needs to support evolved packet system (EPS) AKA authentication and further needs to support EAP-AKA authentication, which increases complexity and costs of a terminal (that is, the UE), and imposes relatively great impact on an existing protocol. The UE-R also requires a new protocol stack to carry the Radius protocol or the Diameter protocol, which increases complexity and costs of the UE-R. In addition, in the prior art, using the AAA server and the UE-R to complete authentication between the remote UE and the network based on the EAP-AKA authentication protocol requires a large message procedure, resulting in low efficiency in authenticating the UE and a poor user experience effect.

SUMMARY

Embodiments of the present invention provide a terminal authenticating method, apparatus, and system. EPS AKA authentication can be used, to complete authentication on UE that accesses a network by using a UE-R. Operations are simple, complexity and costs of a terminal are reduced, and efficiency in authenticating the UE and user experience are improved.

A first aspect of the embodiments of the present invention provides a terminal authenticating method, where the method may include:

receiving, by a UE-to-network relay UE-R, a first request message sent by user equipment UE;

sending, by the UE-R, a second request message to a control network element according to the first request message sent by the UE, so that the control network element sends an authentication data request message to a home subscriber server HSS according to the second request message, where the authentication data request message carries identification information for authenticating on the UE;

receiving, by the UE-R, an authentication request message sent by the control network element, and determining whether the authentication request message is for authenticating on the UE;

if the authentication request message is for authenticating on the UE, sending, by the UE-R, an authentication request message to the UE, where the authentication request message includes an authentication parameter of the UE; and receiving, by the UE-R, an authentication response message sent by the UE according to the authentication request message, and sending the authentication response message to the control network element, so as to complete authentication on the UE by using the control network element.

With reference to the first aspect, in a first possible implementation manner, the first request message sent by the UE includes the identification information for authenticating on the UE; and the sending, by the UE-R, a second request message to a control network element according to the first request message sent by the UE includes:

adding, by the UE-R to the second request message, the identification information for authenticating on the UE that is carried in the first request message, and sending the second request message to the control network element.

With reference to the first aspect or the first possible implementation manner of the first aspect, in a second possible implementation manner, the first request message sent by the UE does not include the identification information for authenticating on the UE; and the sending, by the UE-R, a second request message to a control network element according to the first request message sent by the UE includes:

adding, by the UE-R, the identification information for authenticating on the UE to the second request message, and sending the second request message to the control network element.

With reference to any one of the first aspect to the second possible implementation manner of the first aspect, in a third possible implementation manner, the authentication request message sent by the control network element includes authentication identification information that is for authenticating on the UE and is set by the HSS according to the identification information for authenticating on the UE; and the determining whether the authentication request message is for authenticating on the UE includes:

determining whether the authentication request message includes the authentication identification information; and if the authentication request message includes the authentication identification information, determining that the authentication request message is for authenticating on the UE.

A second aspect of the embodiments of the present invention provides a terminal authenticating method, where the method may include:

receiving, by an HSS, an authentication data request message sent by a control network element, and determining, according to the authentication data request message, whether the authentication data request message includes identification information for authenticating on UE;

if the authentication data request message includes the identification information for authenticating on the UE, setting, by the HSS, in an authentication vector, authentication identification information for authenticating on the UE; and sending, by the HSS, the authentication vector to the control network element so as to send the authentication identification information to a UE-R by using the control network element, so that the UE-R determines, according to the authentication identification information, whether to perform authentication on the UE.

With reference to the second aspect, in a first possible implementation manner, the authentication vector includes a RAND parameter, an AUTN parameter, an XRES parameter, and a Kasme parameter; and the setting, by the HSS in an authentication vector, authentication identification information for authenticating on the UE includes:

setting, by the HSS, the authentication identification information in an authentication management field AMF parameter in the AUTN parameter in the authentication vector.

With reference to the second aspect or the first possible implementation manner of the second aspect, in a second possible implementation manner, the authentication vector includes a RAND parameter, an AUTN parameter, an XRES parameter, and a Kasme parameter; and the setting, by the HSS in an authentication vector, authentication identification information for authenticating on the UE further includes:

encrypting, by the HSS, the RAND parameter in the authentication vector; and setting, by the HSS, the authentication identification information in an AMF parameter in the AUTN parameter in the authentication vector.

A third aspect of the embodiments of the present invention provides a terminal authenticating method, where the method may include:

sending, by UE, a first request message to a UE-R, so that the UE-R sends a second request message to a control network element according to the first request message;

receiving, by the UE, an authentication request message sent by the UE-R, where the authentication request message carries authentication identification information for authenticating on the UE;

decrypting, by the UE, encrypted information in the authentication identification information, and computing an authentication response according to information obtained by the decryption; and sending, by the UE, the authentication response to the UE-R, so as to send the authentication response to the control network element by using the UE-R, for performing authentication on the UE.

With reference to the third aspect, in a first possible implementation manner, the first request message sent by the UE to the UE-R includes identification information for authenticating on the UE.

A fourth aspect of the embodiments of the present invention provides a terminal authenticating method, where the method may include:

receiving, by a control network element, a second request message sent by a UE-R, and determining whether the second request message includes identification information for authenticating on UE;

if the second request message includes the identification information for authenticating on the UE, sending, by the control network element, an authentication data request message to an HSS, where the authentication data request message carries the identification information for authenticating on the UE;

acquiring, by the control network element, from the HSS, an authentication vector determined by the HSS according to the authentication data request message; and sending, by the control network element, an authentication request message that includes information about the authentication vector to the UE-R, so that the UE-R determines whether the authentication request message is for authenticating on the UE.

With reference to the fourth aspect, in a first possible implementation manner, after the receiving, by a control network element, a second request message sent by a UE-R, the method further includes:

determining whether the second request message is of a specified message type; and if the second request message is of the specified message type, sending, by the control network element, the authentication data request message to the HSS.

With reference to the fourth aspect or the first possible implementation manner of the fourth aspect, in a second possible implementation manner, before the sending, by the control network element, the authentication data request message to the HSS, the method further includes:

adding, by the control network element, the identification information for authenticating on the UE to the authentication data request message.

With reference to any one of the fourth aspect to the second possible implementation manner of the fourth aspect, in a third possible implementation manner, before the sending, by the control network element, an authentication request message that includes the authentication vector to the UE-R, the method further includes:

adding, by the control network element, the identification information for authenticating on the UE to the authentication request message.

A fifth aspect of the embodiments of the present invention provides a terminal authentication relay device, where the relay device may include:

a receiving module, configured to receive a first request message sent by UE;

a sending module, configured to send a second request message to a control network element according to the first request message sent by the UE, so that the control network element sends an authentication data request message to an HSS according to the second request message, where the authentication data request message carries identification information for authenticating on the UE; where the receiving module is configured to receive an authentication request message sent by the control network element; and a determining module, configured to determine, according to the authentication request message received by the receiving module, whether the authentication request message is for authenticating on the UE; where the sending module is configured to: when a result of the determining by the determining module is yes, send an authentication request message to the UE, where the authentication request message includes an authentication parameter of the UE;

the receiving module is further configured to receive an authentication response message that is sent by the UE according to the authentication request message sent by the sending module; and the sending module is configured to send, to the control network element, the authentication response message received by the receiving module, so as to complete authentication on the UE by using the control network element.

With reference to the fifth aspect, in a first possible implementation manner, the first request message that is sent by the UE and received by the receiving module includes the identification information for authenticating on the UE; and the sending module is further specifically configured to:

add, to the second request message, the identification information for authenticating on the UE that is carried in the first request message, and send the second request message to the control network element.

With reference to the fifth aspect or the first possible implementation manner of the fifth aspect, in a second possible implementation manner, the first request message that is sent by the UE and received by the receiving module does not include the identification information for authenticating on the UE; and the sending module is specifically configured to:

add the identification information for authenticating on the UE to the second request message, and send the second request message to the control network element.

With reference to any one of the fifth aspect to the second possible implementation manner of the fifth aspect, in a third possible implementation manner, the authentication request message that is sent by the control network element and received by the receiving module includes authentication identification information that is for authenticating on the UE and is set by the HSS according to the identification information for authenticating on the UE; and the determining module is specifically configured to:

determine whether the authentication request message includes the authentication identification information; and if the authentication request message includes the authentication identification information, determine that the authentication request message is for authenticating on the UE.

A sixth aspect of the embodiments of the present invention provides a terminal authentication server, where the server may include:

a receiving module, configured to receive an authentication data request message sent by a control network element;

a determining module, configured to determine, according to the authentication data request message received by the receiving module, whether the authentication data request message includes identification information for authenticating on UE;

a processing module, configured to: when a result of the determining by the determining module is yes, set, in an authentication vector, authentication identification information for authenticating on the UE; and a sending module, configured to send, to the control network element, the authentication vector obtained by processing by the processing module, so as to send the authentication identification information to a UE-R by using the control network element, so that the UE-R determines, according to the authentication identification information, whether to perform authentication on the UE.

With reference to the sixth aspect, in a first possible implementation manner, the authentication vector obtained by processing by the processing module includes a RAND parameter, an AUTN parameter, an XRES parameter, and a Kasme parameter; and the processing module is specifically configured to:

set the authentication identification information in an AMF parameter in the AUTN parameter in the authentication vector.

With reference to the sixth aspect or the first possible implementation manner of the sixth aspect, in a second possible implementation manner, the authentication vector obtained by processing by the processing module includes a RAND parameter, an AUTN parameter, an XRES parameter, and a Kasme parameter; and the processing module is further specifically configured to:

encrypt the RAND parameter in the authentication vector; and set the authentication identification information in an AMF parameter in the AUTN parameter in the authentication vector.

A seventh aspect of the embodiments of the present invention provides terminal authentication user equipment, where the user equipment may include:

a sending module, configured to send a first request message to a UE-R, so that the UE-R sends a second request message to a control network element according to the first request message;

a receiving module, configured to receive an authentication request message sent by the UE-R, where the authentication request message carries authentication identification information for authenticating on the UE; and a processing module, configured to decrypt encrypted information in the authentication identification information, and compute an authentication response according to information obtained by the decryption.

With reference to the seventh aspect, in a first possible implementation manner, the first request message sent by the sending module includes identification information for authenticating on the UE.

An eighth aspect of the embodiments of the present invention provides a terminal authentication control device, where the control device may include:

a receiving module, configured to receive a second request message sent by a UE-R;

a processing module, configured to determine, according to the second request message received by the receiving module, whether the second request message includes identification information for authenticating on UE; and a sending module, configured to: when a result of the determining by the processing module is yes, send an authentication data request message to an HSS, where the authentication data request message carries the identification information for authenticating on the UE; where the receiving module is configured to acquire, from the HSS, an authentication vector determined by the HSS according to the authentication data request message; and the sending module is further configured to send, to the UE-R, an authentication request message that includes information about the authentication vector and is received by the receiving module, so that the UE-R determines whether the authentication request message is for authenticating on the UE.

With reference to the eighth aspect, in a first possible implementation manner, the control device further includes:

a determining module, configured to determine, according to the second request message received by the receiving module, whether the second request message is of a specified message type; and if the second request message is of the specified message type, instruct the sending module to send the authentication data request message to the HSS.

With reference to the eighth aspect or the first possible implementation manner of the eighth aspect, in a second possible implementation manner, the sending module is further specifically configured to:

add the identification information for authenticating on the UE to the authentication data request message, and send the authentication data request message to the HSS.

With reference to any one of the eighth aspect to the second possible implementation manner of the eighth aspect, in a third possible implementation manner, the sending module is further specifically configured to:

add the identification information for authenticating on the UE to the authentication request message that includes the authentication vector, and send the authentication request message to the UE-R.

A ninth aspect of the embodiments of the present invention provides a terminal authentication system, where the system may include: the relay device provided in the fifth aspect of the embodiments of the present invention, the server provided in the sixth aspect of the embodiments of the present invention, the user equipment provided in the seventh aspect of the embodiments of the present invention, and the control device provided in the eighth aspect of the embodiments of the present invention.

In the embodiments of the present invention, when accessing a network by using a UE-R, UE may send, to a control network element by using the UE-R, a request that includes identification information of the UE, so as to acquire an authentication vector message of the UE by using the control network element. The UE-R may determine, according to the acquired authentication vector message, whether the authentication vector message is for authenticating on the UE, and if the authentication vector message is for authenticating on the UE, send an authentication request to the UE, and further may complete authentication on the UE by using the control network element. Operations are simple, complexity and costs of a terminal are reduced, and efficiency in authenticating the UE and user experience are improved.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in embodiments of the present invention with reference to the accompanying drawings in the embodiments of the present invention. Apparently, the embodiments described in the following are merely some but not all of the embodiments of the present invention. All other embodiments obtained by a person of ordinary skill in the art based on the embodiments of the present invention without creative efforts shall fall within the protection scope of the present disclosure.

In a ProSe technology, when UE accesses a network by using a UE-R, an EPS AKA authentication principle may be used in the embodiments of the present invention to perform authentication on the UE that accesses the network, so as to prevent unauthorized UE from accessing the network by using the UE-R and prevent a security threat to the network. In the Prose technology, when the UE-R accesses the network as common Long Term Evolution (LTE) UE, the network exactly uses EPS AKA authentication when performing authentication on the UE-R. Likewise, a Generic Bootstrapping Architecture (GBA)-based AKA bootstrapping procedure may take the place of an EPS AKA authentication procedure to be applied to the embodiments described in the following. A mobility management entity (MME) in the embodiments of the present invention may be a ProSe Function (a function control network element in a ProSe service).

Figure 1:
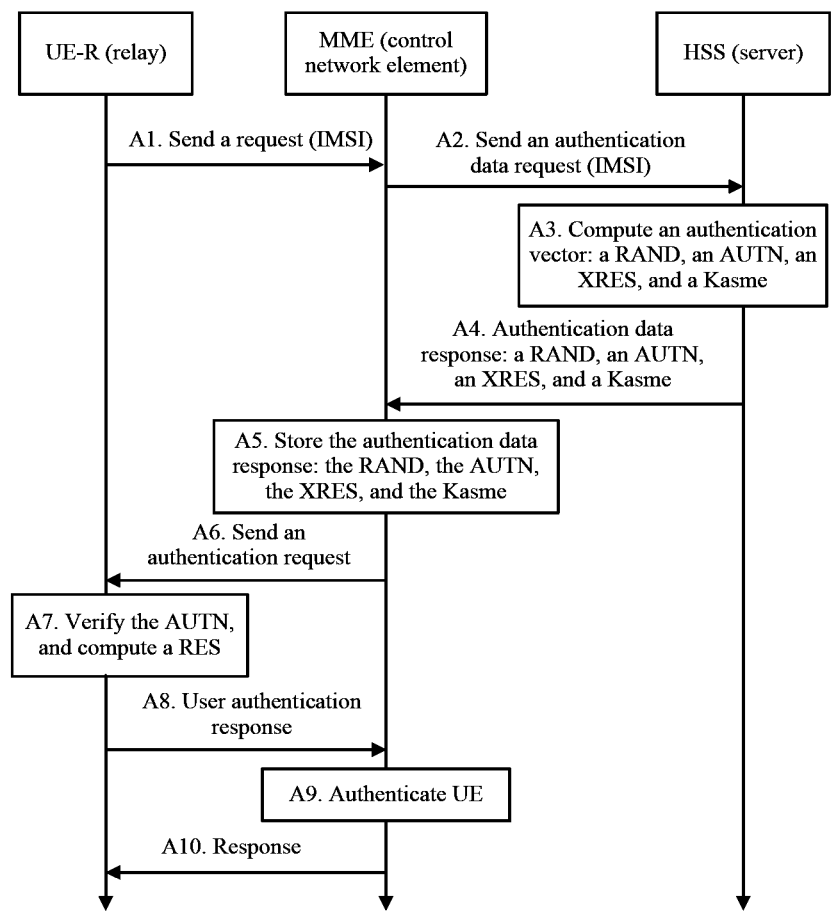
FIG. 1 is a schematic diagram of performing authentication on a UE-R by using an AKA authentication principle in the prior art.

Referring to FIG. 1, FIG. 1 is a schematic interaction diagram of performing, by a network, authentication on a UE-R by using an AKA in the prior art, which may include steps A1 to A10.

A1. The UE-R sends a request to an MME.

In the prior art, the request sent by the UE-R to the MME includes an international mobile subscriber identity (IMSI) of the UE-R.

A2. The MME sends an authentication data request to an HSS.

In the prior art, after receiving the request sent by the UE-R, the MME may send the authentication data request to the home subscriber server (HSS), where the authentication data request includes the IMSI of the UE-R.

A3. The HSS computes an authentication vector.

In the prior art, when the HSS receives the authentication data request sent by the MME, the HSS may compute the authentication vector used for performing authentication on the UE-R, where the authentication vector includes a RAND (random number) parameter, an AUTN (Authentication token) parameter, an XRES (Expected user response) parameter, a Kasme parameter, and the like.

A4. The HSS sends an authentication data response to the MME.

Specifically, the authentication data response sent by the HSS to the MME includes a RAND parameter, an AUTN parameter, an XRES parameter, a Kasme, and the like.

A5. The MME stores the authentication data response.

In the prior art, after receiving the authentication data response sent by the HSS, the MME may store the received authentication data response, and send an authentication request to the UE-R.

A6. The MME sends an authentication request to the UE-R.

Specifically, the authentication request sent by the MME to the UE-R includes the RAND parameter and AUTN parameter.

A7. The UE-R verifies an AUTN, and computes a RES (response) parameter.

In the prior art, after receiving the authentication request sent by the MME, the UE-R may perform verification on the AUTN in the authentication request, and after it is verified that the AUTN is correct, the UE-R may compute the RES parameter, and further may send the RES parameter to the MME.

A8. The UE-R sends a user authentication response to the MME.

A9. The MME authenticates UE.

A10. The MME sends an authentication response to the UE-R.

Specifically, the user authentication response includes the RES parameter. After receiving the RES parameter sent by the UE-R, the MME may compare the RES parameter with the XRES parameter stored in the MME and perform authentication on the UE-R. When the MME learns by comparison that the RES and the XRES are consistent, the MME may complete authentication on the UE-R by using the authentication on the UE-R, and feed back an authentication result to the UE-R by using the authentication response.

In embodiments of the present invention, when UE accesses a network by using a UE-R, the EPS AKA authentication principle is used, to perform authentication on the UE, and a new protocol (such as an EAP-AKA protocol) is not required to perform authentication on the UE. The UE needs to support only an EPS AKA protocol, and does not need to support both the EPS AKA protocol and the EAP-AKA protocol, which reduces complexity and costs of a terminal. In the embodiments of the present invention, when the UE accesses the network by using the UE-R, the EPS AKA protocol is used, to perform authentication on the UE, and the UE-R can directly support authentication on the UE. A new protocol stack does not need to be established between the UE and the UE-R to support a new protocol, the UE-R supports complexity of authentication on the UE, costs are low, operations are convenient, and authentication efficiency is high. The following describes, in detail with reference to the EPS AKA authentication process described in FIG. 1, a specific implementation process of performing authentication on UE by using an EPS AKA in the embodiments of the present invention.

Figure 2:
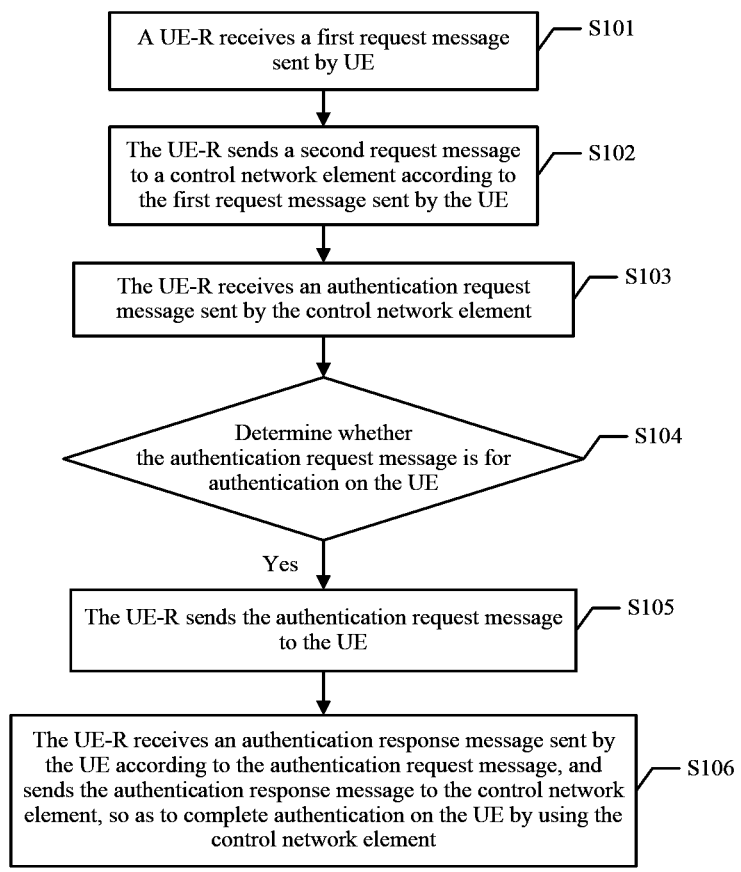
FIG. 2 is a schematic flowchart of a first embodiment of a terminal authenticating method according to an embodiment of the present invention.

Referring to FIG. 2, FIG. 2 is a schematic flowchart of a first embodiment of a terminal authenticating method according to an embodiment of the present invention. The terminal authenticating method described in this embodiment includes steps:

S101. A UE-R receives a first request message sent by UE.

S102. The UE-R sends a second request message to a control network element according to the first request message sent by the UE.

In some feasible implementation manners, the first request message sent by the UE may include an identity (an IMSI) of the UE and identification information (an Indication) of the UE (that is, identification information for authenticating on the UE). The identification information Indication may indicate that the first request message is a request that is sent by the UE for accessing a network by using the UE-R. In specific implementation, after the UE accesses the network by using the UE-R and sends the first request message that includes the IMSI and Indication of the UE to the UE-R, the UE-R may send the second request message to the control network element according to the first request message sent by the UE. Specifically, a message type of the second request message and a message type of the first request message may be the same or different, which may be specifically set according to an actual scenario requirement for authenticating on the UE.

Figure 3:
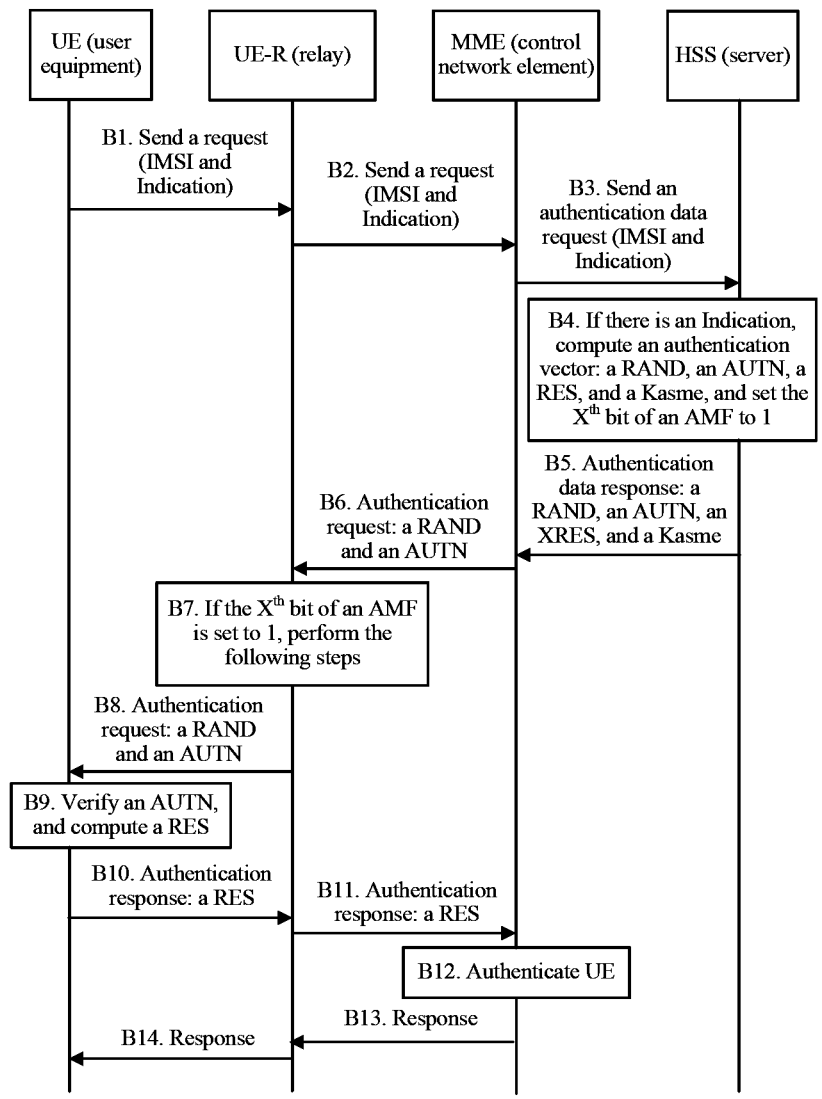
FIG. 3 is a first schematic interaction diagram of a terminal authenticating method according to an embodiment of the present invention.

In specific implementation, when sending the second request message to an MME, the UE-R may add the identification information for authenticating on the UE to the second request message, where the identification information for authenticating on the UE is used to identify that the second request message is a request message sent by the UE-R to the MME when the UE accesses the network by using the UE-R. Specifically, when the first request message that is sent by the UE and received by the UE-R includes the identification information (that is, an Indication) for authenticating on the UE, the UE-R may use the identification information Indication as the identification information for authenticating on the UE and add the identification information Indication to the second request message; or the UE-R may re-select identification information Indication (which has a function the same as that of the identification information for authenticating on the UE that is included in the first request message), use the identification information Indication as the identification information for authenticating on the UE, and add the re-selected identification information Indication to the second request message, where the re-selected identification information may be the same as or different from the identification information for authenticating on the UE that is included in the first request message. Then, the UE-R sends the second request message to the MME (that is, the control network element). As shown in FIG. 3, when the UE-R receives the first request message sent by the UE, if the received first request message includes the IMSI and Indication of the UE, the UE-R may add, to the second request message, the IMSI and Indication of the UE that are included in the first request message; or the UE-R may re-select an Indication, add the IMSI and the re-selected Indication to the second request message. Then, the second request message is sent to the control network element. After receiving, by using the UE-R, the second request message sent by the UE-R, the control network element on a network side may determine, according to the Indication of the UE included in the second request message, that authentication currently needs to be performed on the UE that accesses the network by using the UE-R, but not on the UE-R. Then, the MME may send a corresponding user authentication data request message to an HSS.

Figure 4:
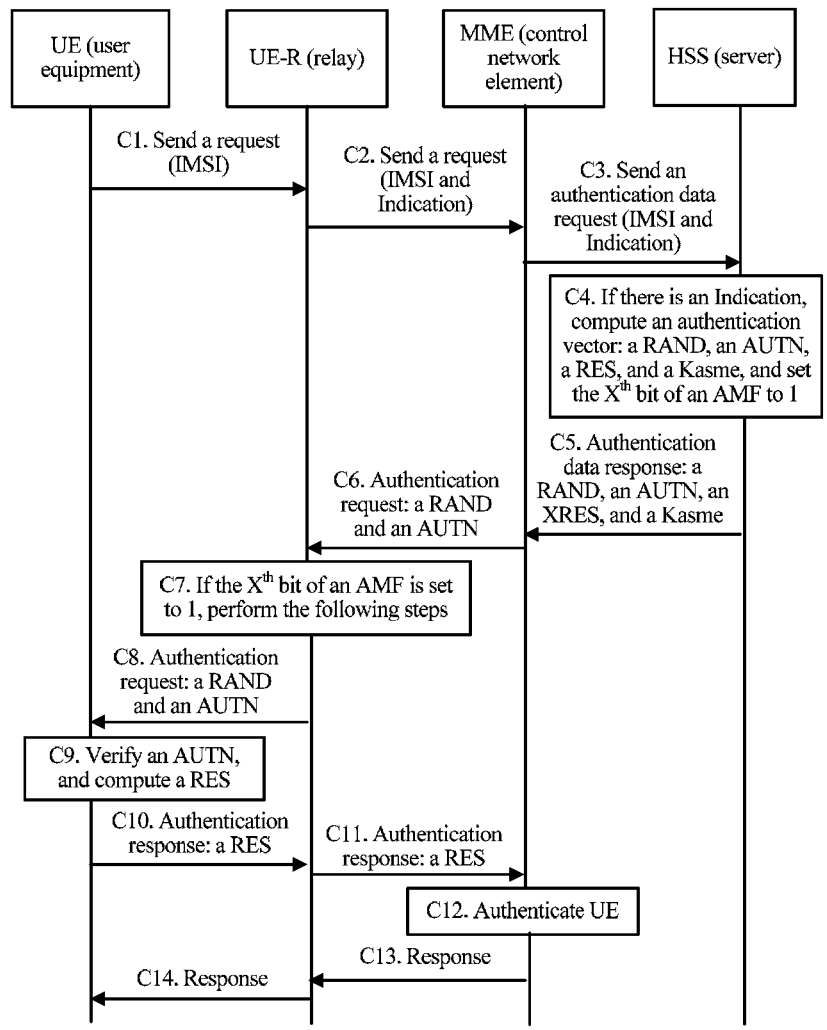
FIG. 4 is a second schematic interaction diagram of a terminal authenticating method according to an embodiment of the present invention.

In some feasible implementation manners, as shown in FIG. 4, when the first request message sent by the UE includes only the IMSI of the UE, and does not include the identification information (an Indication) for authenticating on the UE, after the UE accesses the network by using the UE-R and sends the first request message that includes the IMSI of the UE to the UE-R, the UE-R may send the second request message to the control network element according to the first request message sent by the UE. Specifically, a message type of the second request message and a message type of the first request message may be the same or different, which may be specifically set according to an actual scenario requirement for authenticating on the UE.

In specific implementation, as shown in FIG. 4, when the first request message received by the UE-R includes only the IMSI of the UE, the UE-R may add the identification information Indication (that is, the identification information for authenticating on the UE) to the first request message sent by the UE, add the IMSI and the Indication to the second request message, and send the second request message that includes the IMSI and Indication of the UE to the control network element. After receiving, by using the UE-R, the second request message sent by the UE-R, the control network element on the network side may determine, according to the Indication of the UE included in the second request message, that authentication currently needs to be performed on the UE that accesses the network by using the UE-R, but not on the UE-R.

Figure 5:
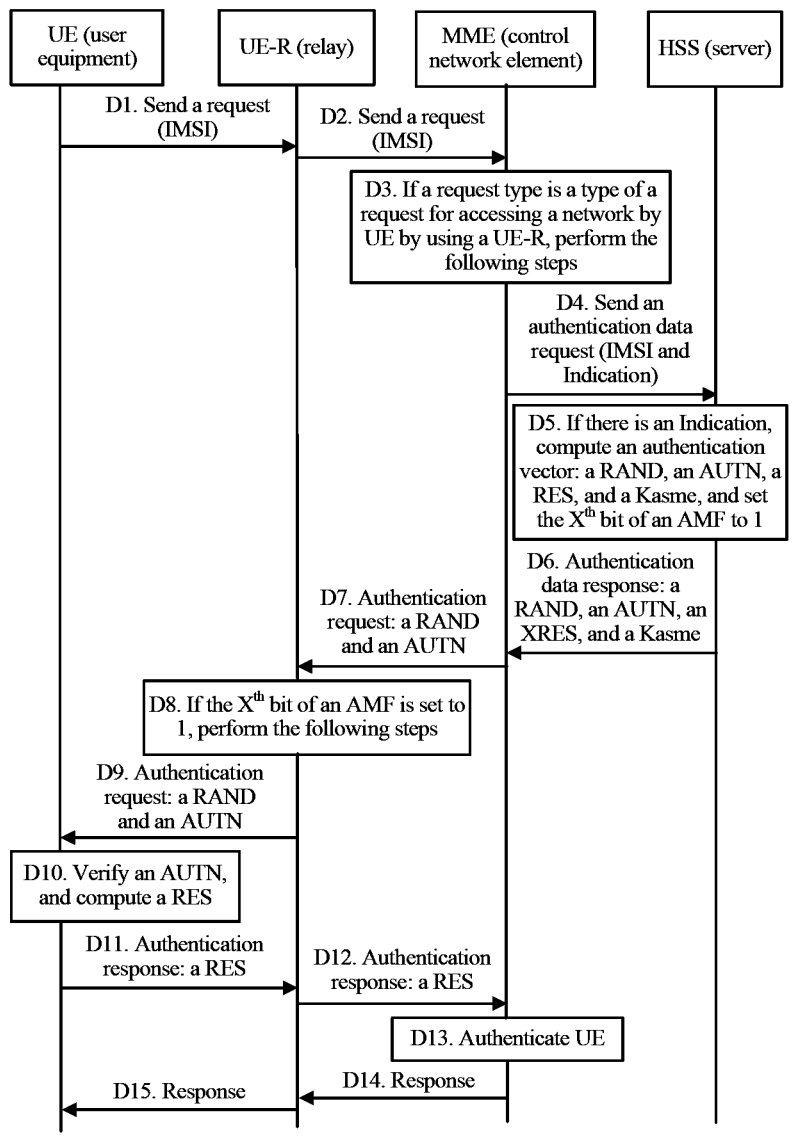
FIG. 5 is a third schematic interaction diagram of a terminal authenticating method according to an embodiment of the present invention.

In specific implementation, as shown in FIG. 5, when the first request message sent by the UE includes only the IMSI of the UE, after the UE accesses the network by using the UE-R and sends the first request message that includes the IMSI of the UE to the UE-R, the UE-R may send the second request message to the control network element according to the first request message sent by the UE. Specifically, a message type of the second request message and a message type of the first request message may be the same or different, which may be specifically set according to an actual scenario requirement for authenticating on the UE.

In specific implementation, as shown in FIG. 5, when the first request message received by the UE-R includes only the IMSI of the UE, the UE-R may directly add the IMSI of the UE in the first request message to the second request message, and send the second request message that includes the IMSI of the UE to the control network element. That is, in the foregoing implementation manner, the second request message sent by the UE-R to the control network element includes the IMSI of the UE, and does not include the identification information Indication. In specific implementation, in the foregoing implementation manner, after the UE-R sends the second request message that includes only the IMSI of the UE to the control network element on the network side, the control network element cannot acquire the Indication directly from the second request message because there is no Indication in the second request message. In this case, the control network element may determine, according to the message type of the second request message, whether the request is an authentication request sent by the UE when the UE accesses the network by using the UE-R or an authentication request sent by the UE-R when the UE-R accesses the network. Specifically, the control network element may perform matching between the message type of the received second request message and a prestored specified message type, and determine whether the message type of the second request message belongs to the specified message type. If it is determined that the message type of the second request message is the specified message type, the control network element may send the corresponding user authentication data request message to the HSS, and may further inform the HSS, by using the user authentication data request message, whether the UE accesses the network or the UE-R accesses the network. That is, the control network element learns, by determining the message type of the second request message, whether the message type of the currently received second request message is the specified message type, so as to determine content included in the user authentication data request message sent to the HSS. That is, it may be determined that authentication needs to be performed on the UE that accesses the network by using the UE-R, but not on the UE-R.

In some feasible implementation manners, after receiving the second request message sent by the UE-R, the network side may compute, according to the second request message, an authentication vector used for performing authentication on the UE. In specific implementation, as shown in FIG. 3 or FIG. 4, when the second request message received by the control network element on the network side includes the identification information Indication, it may be determined that the second request message is a request that is sent by the UE for accessing the network by using the UE-R, but not a request for accessing the network by the UE-R, that is, when it is determined that the second request message includes the Indication, the network side may compute the authentication vector used for performing authentication on the UE. Specifically, when it is determined that the second request message includes the Indication, the network side may set authentication identification information (that is, authentication identification information for authenticating on the UE) in the authentication vector used for performing authentication on the UE, where the authentication identification information is used to indicate that the authentication vector is for authenticating on the UE, and send the authentication vector that includes the authentication identification information to the UE-R by using an authentication request message. Specifically, when setting the authentication identification information for authenticating on the UE, the network side may set, in an AMF parameter in the authentication vector, the authentication identification information for authenticating on the UE. For example, the $X^{th}$ bit of an AMF parameter may be set to 1 in an AUTN parameter in the authentication vector, where $1 \leq X \leq 7$, that is, the $X^{th}$ bit of the AMF parameter may be any one of seven idle bits of the AMF parameter. The network side sets the flag bit, and sends an authentication vector that includes the flag bit to the UE-R, and the UE-R then may determine, according to the flag bit, that the received authentication vector is used for authenticating on the UE but not for authenticating on the UE-R.

In specific implementation, when the second request message received by the network side does not include the identification information Indication, the network side may further determine, according to the message type of the second request message, that the second request message is a request message that is sent by the UE for accessing the network by using the UE-R, but not a request message that is sent by the UE-R for accessing the network. When it is determined that the received second request message is a request message that is sent by the UE for accessing the network by using the UE-R, the network side may compute the authentication vector used for performing authentication on the UE, set, in the authentication vector, the authentication identification information for authenticating on the UE, and further, send authentication vector parameters RAND and AUTN that include the authentication identification information for authenticating on the UE to the UE-R.

S103. The UE-R receives an authentication request message sent by the control network element.

S104. The UE-R determines whether the authentication request message is for authenticating on the UE, and if a result of the determining is yes, performs step S105.

S105. The UE-R sends an authentication request message to the UE.

Figure 10:
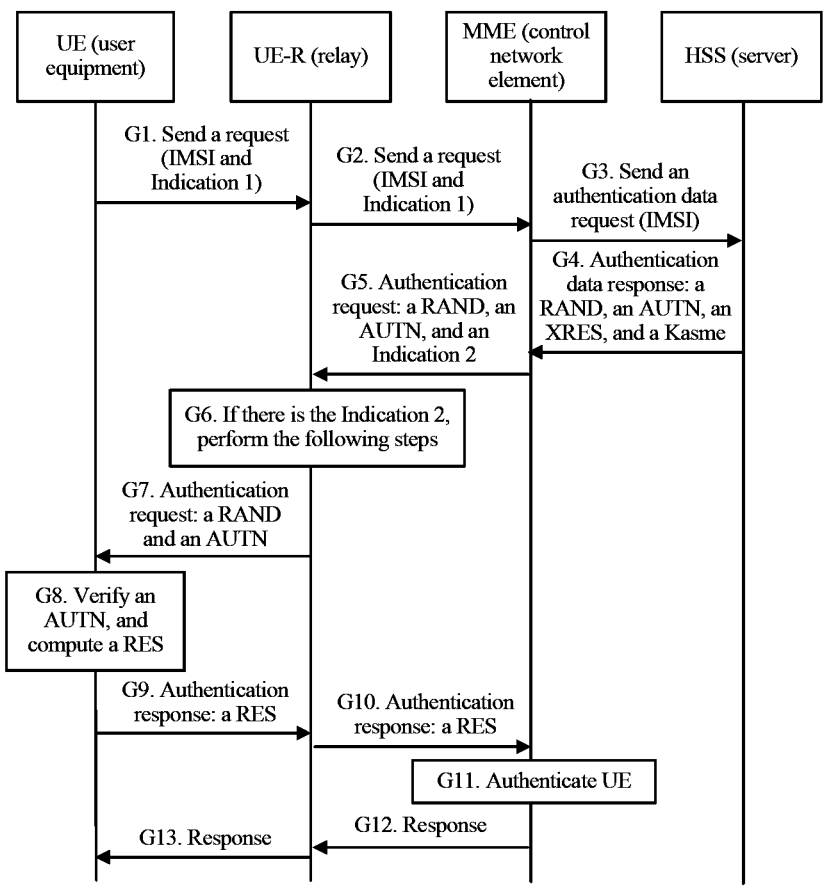
FIG. 10 is a seventh schematic interaction diagram of a terminal authenticating method according to an embodiment of the present invention.

In some feasible implementation manners, after receiving the authentication request message sent by the control network element on the network side, the UE-R may determine, according to various parameter information of the authentication vector included in the authentication request message, whether the authentication request message is for authenticating on the UE. If it is determined that the authentication request message is for authenticating on the UE, the UE-R sends the authentication request message to the UE. In specific implementation, when the UE-R receives the authentication request message sent by the control network element, the UE-R may determine whether the authentication request message includes the authentication identification information for authenticating on the UE. For example, the UE-R may determine whether the $X^{th}$ bit of the AMF parameter of the authentication vector in the authentication request message is 1. If it is determined that the $X^{th}$ bit of the AMF in the authentication vector is 1, the UE-R determines that the authentication request message is for authenticating on the UE. In addition, as shown in FIG. 10, it may further be determined whether the authentication request message includes identification information Indication 2. If there is the identification information Indication 2, it is determined that the authentication request message is for authenticating on the UE. Then, the UE-R may send the authentication request message to the UE, and send parameters such as AUTN and the RAND in the authentication vector to the UE, so as to be verified by the UE.

S106. The UE-R receives an authentication response message sent by the UE according to the authentication request message, and sends the authentication response message to the control network element, so as to complete authentication on the UE by using the control network element.

In some feasible implementation manners, when sending the authentication request message to the UE, the UE-R sends, to the UE, the RAND and AUTN that are received from the network side. After receiving the RAND and AUTN that are sent by the UE-R, the UE may perform verification on the parameters RAND and AUTN, to verify correctness of the AUTN parameter. After it is verified that the AUTN is correct, the UE may compute a RES parameter, and send, to the UE-R, the RES parameter obtained by computing. After receiving the authentication response (including the RES parameter) sent by the UE, the UE-R may send the authentication response to the control network element on the network side, so as to complete authentication on the UE by using the control network element. The control network element completes authentication on the UE.

In this embodiment of the present invention, a UE-R may receive a request message sent by UE, send an authentication request message to a network side according to the request message sent by the UE, and acquire, from the network side, an authentication vector that includes authentication identification information for authenticating on the UE. The UE-R may determine, according to an authentication request message sent by the network side, whether to perform authentication on the UE or the UE-R, and further send the authentication request message to the UE, so as to complete authentication on the UE. Operations are simple, costs of a terminal are low, and efficiency in authenticating the UE and user experience are improved.

Figure 6:
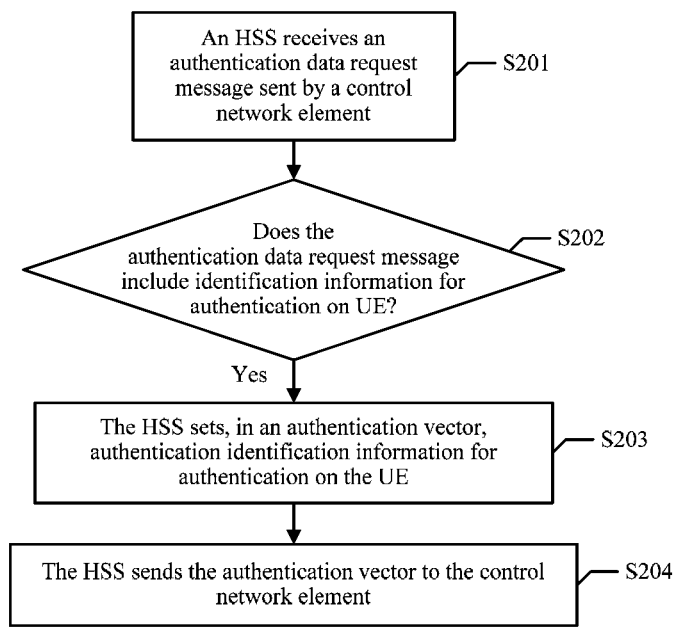
FIG. 6 is a schematic flowchart of a second embodiment of a terminal authenticating method according to an embodiment of the present invention.

Referring to FIG. 6, FIG. 6 is a schematic flowchart of a second embodiment of a terminal authenticating method according to an embodiment of the present invention. The terminal authenticating method described in this embodiment includes steps:

S201. An HSS receives an authentication data request message sent by a control network element.

S202. Determine whether the authentication data request message includes identification information for authenticating on UE, and if a result of the determining is yes, perform step S203.

S203. The HSS sets, in an authentication vector, authentication identification information for authenticating on the UE.

S204. The HSS sends the authentication vector to the control network element.

In some feasible implementation manners, after receiving the authentication data request message sent by the control network element, the HSS on a network side may determine whether the authentication data request message includes the identification information for authenticating on the UE, where the identification information for authenticating on the UE may specifically be an Indication carried in a first request message sent by the UE to a UE-R, and the UE-R adds, to a second request message, the Indication carried in the first request message, further sends the second request message to the control network element, and sends the second request message to the HSS by using the control network element. Alternatively, the identification information for authenticating on the UE may be an Indication added when the UE-R sends the second request message to the control network element according to the first request message. After adding the Indication to the second request message, the UE-R sends the second request message to the control network element, and the control network element may send, to the HSS, the Indication carried in the second request message; that is, the identification information for authenticating on the UE in the second request message may be an Indication selected by the control network element. As shown in FIG. 3, FIG. 4, or FIG. 5, after receiving the authentication data request message sent by the control network element, the HSS may determine whether the authentication data request message includes the identification information for authenticating on the UE, that is, whether there is the Indication in the authentication data request message. If it is determined that the authentication data request message includes the Indication, it may be determined that an authentication object of the authentication data request message is the UE. In specific implementation, when the HSS determines that the authentication object corresponding to the authentication data request message is the UE, the HSS may compute an authentication vector message corresponding to the authentication data request message, that is, an authentication vector message for authenticating on the UE, and may set, in the authentication vector message, the authentication identification information for authenticating on the UE. Specifically, the authentication vector message computed by the HSS may include parameters such as a RAND, an AUTN, an XRES, and a Kasme. When determining the parameters in the authentication vector for authenticating on the UE, the HSS may set, in an AMF parameter in the AUTN parameter, authentication identification information for authenticating on the UE, where the authentication identification information is used to indicate that the authentication vector is for authenticating on the UE. As shown in FIG. 3, FIG. 4, or FIG. 5, the HSS may set the $X^{th}$ bit of the AMF parameter as a flag bit used for authenticating on the UE. For example, the $X^{th}$ bit of the AMF parameter is set to 1, which is used as the authentication identification information for authenticating on the UE, where the Xth bit of the AMF parameter is any one of seven idle bits of the AMF parameter, that is, $1 \leq X \leq 7$.

In some feasible implementation manners, after determining the authentication vector message for authenticating on the UE, and setting the authentication identification information for authenticating on the UE, the HSS may send, to the control network element by using an authentication response message, the authentication vector that includes the authentication identification information for authenticating on the UE, so as to send, by using the control network element, the authentication vector to the UE-R by using an authentication request message. After receiving the authentication request message sent by the control network element, the UE-R may determine, according to the authentication identification information that is for authenticating on the UE and is in the authentication vector included in the authentication request message, that the authentication vector is for authenticating on the UE, but not for authenticating on the UE-R, and may further send a corresponding authentication parameter in the authentication vector to the UE, so as to implement authentication on the UE.

Figure 7:
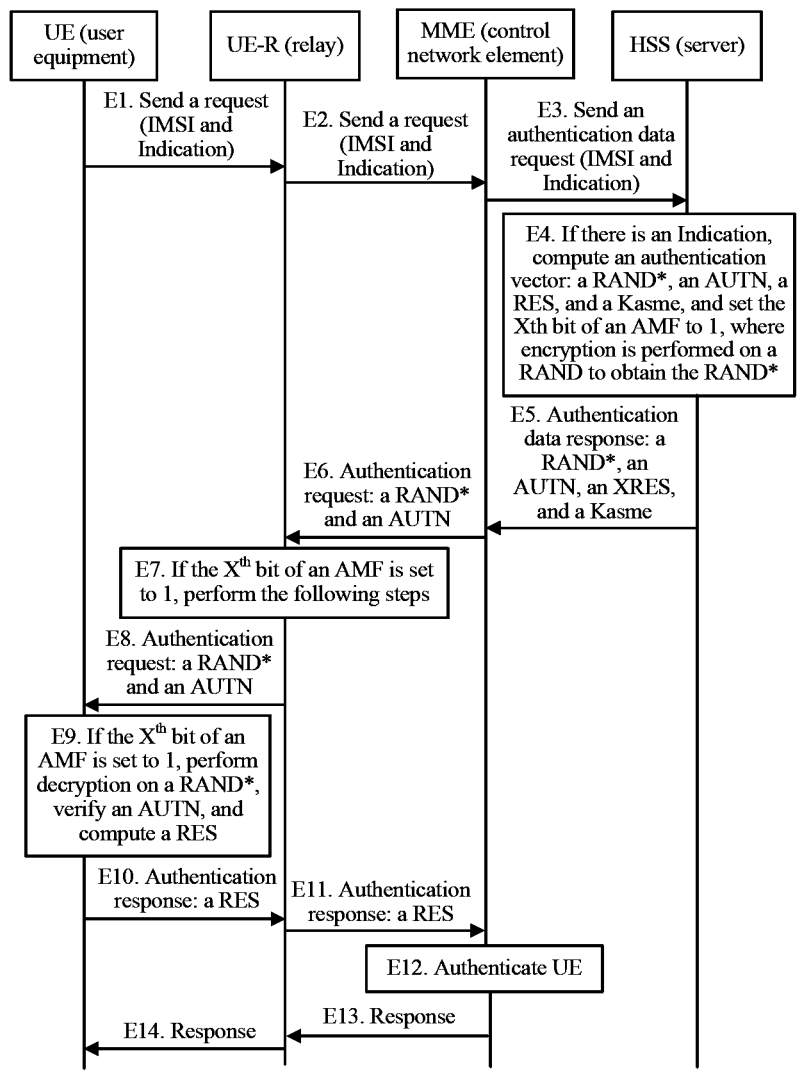
FIG. 7 is a fourth schematic interaction diagram of a terminal authenticating method according to an embodiment of the present invention.
Figure 8:
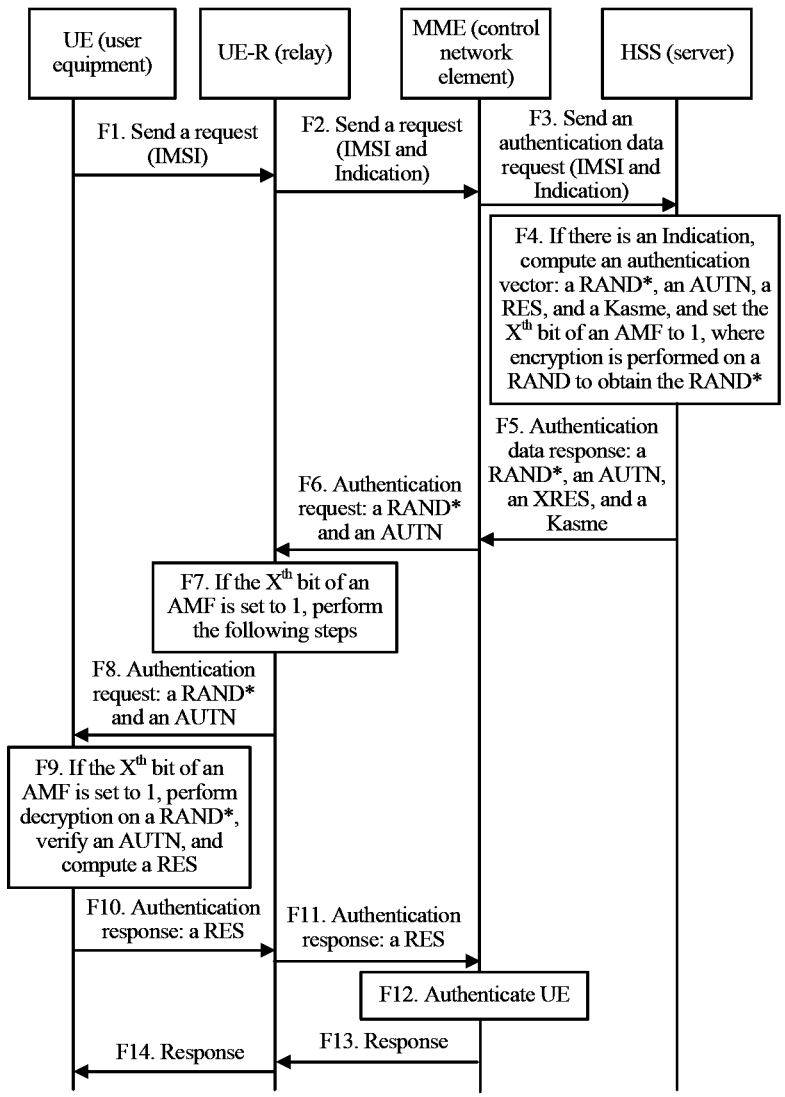
FIG. 8 is a fifth schematic interaction diagram of a terminal authenticating method according to an embodiment of the present invention.
Figure 9:
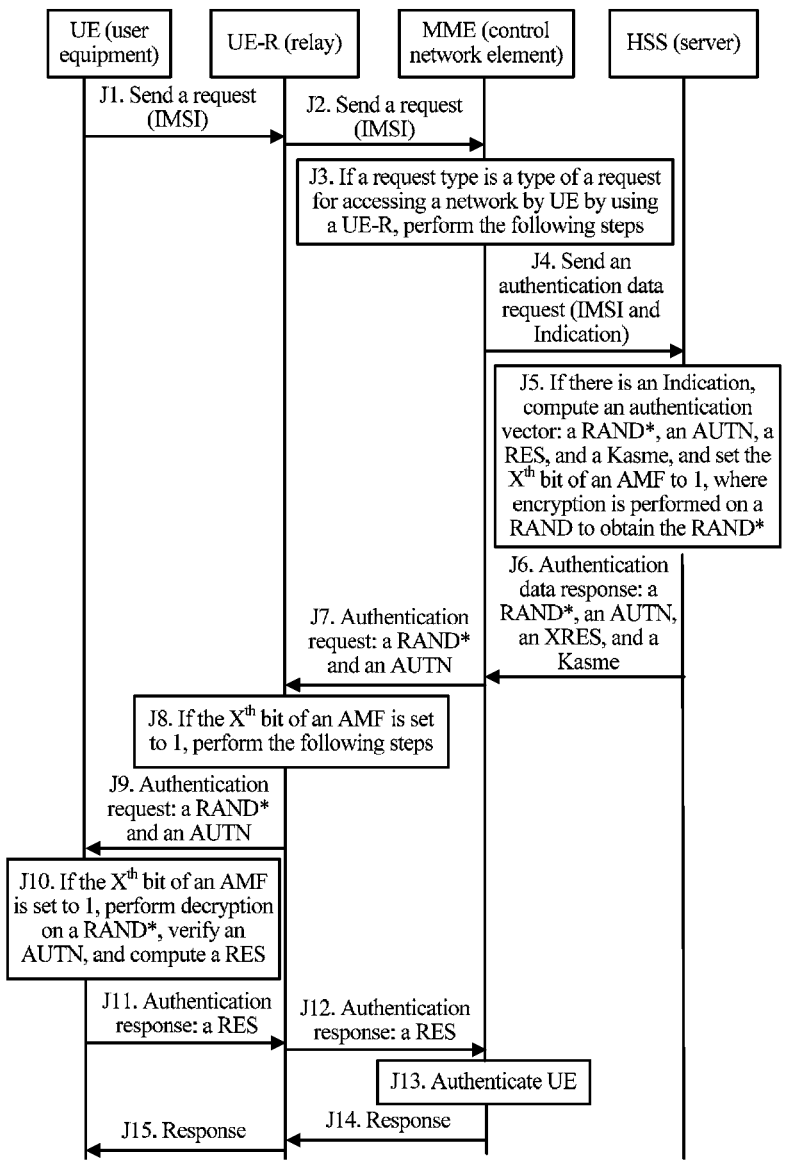
FIG. 9 is a sixth schematic interaction diagram of a terminal authenticating method according to an embodiment of the present invention.

In some feasible implementation manners, as shown in FIG. 7 or FIG. 8, after receiving the authentication data request message sent by the control network element, if it is determined that the authentication data request message includes the identification information for authenticating on the UE, that is, there is the Indication in the authentication data request message, the HSS may compute the authentication vector for authenticating on the UE, and set the Xth bit of the AMF parameter in the AUTN parameter of the authentication vector, so as to set the authentication identification information for authenticating on the UE. In addition, as shown in FIG. 9, after the HSS receives the authentication data request message sent by the control network element, if it is determined that the authentication data request message includes the identification information for authenticating on the UE, that is, there is the Indication in the authentication data request message, the HSS may further encrypt the RAND parameter in the authentication vector, and set the Xth bit of the AMF parameter as a flag bit for encrypting the RAND parameter. That the Xth bit of the AMF is set to 1 is used as identification information for encrypting the RAND parameter to obtain an encrypted RAND parameter RAND*. That is, that the Xth bit of the AMF parameter is 1 may be set as encrypting the RAND parameter, and adding the authentication identification information for authenticating on the UE to the authentication vector. When the UE-R receives the authentication vector, if it is determined that the Xth bit of the AMF parameter in the authentication vector is 1, it may be determined that the authentication vector is an authentication vector for authenticating on the UE. The UE-R may send an authentication request to the UE, and send the RAND* parameter and the AUTN parameter in the authentication vector to the UE. After receiving parameter information of the authentication vector, if it is determined that the Xth bit of the AMF parameter in the AUTN parameter is 1, the UE may decrypt the RAND* parameter and then may perform verification on the AUTN. That is, when computing the authentication vector for authenticating on the UE, the HSS may set, by using a setting method, the authentication identification information for authenticating on the UE, and may further protect the parameter RAND in the authentication vector by using an encryption method at the same time, which can improve efficiency in authenticating the UE and a user experience effect.

Figure 11:
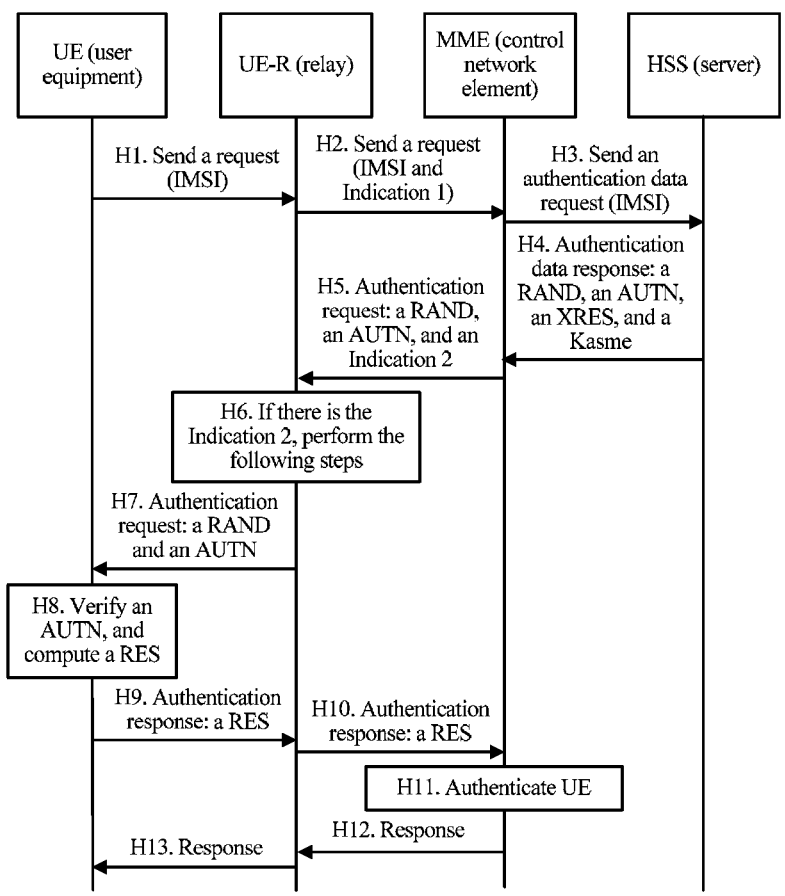
FIG. 11 is an eighth schematic interaction diagram of a terminal authenticating method according to an embodiment of the present invention.

In some feasible implementation manners, if the authentication data request message that is sent by the control network element and received by the HSS does not include the identification information for authenticating on the UE, that is, does not include the Indication, as shown in FIG. 10 or FIG. 11, the HSS may compute, according to a method for authenticating on the UE-R, the authentication vector for authenticating on the UE and does not perform setting or encryption on the authentication vector; and directly sends the authentication vector to the control network element by using authentication data response information, so as to process the authentication data response message by using the control network element and send the authentication request message to the UE-R by using the control network element. The UE-R may determine, according to the authentication vector processed by using the control network element, whether the authentication request message is for authenticating on the UE or for authenticating on the UE-R.

In this embodiment of the present invention, after receiving an authentication data request sent by a control network element, an HSS on a network side may compute, according to the received authentication data request, an authentication vector for authenticating on UE, and may further set a parameter in the authentication vector so as to identify a message, or encrypt a parameter in the authentication vector to protect the parameter. A UE-R may determine, by using the authentication vector sent by the HSS, whether the authentication vector is for authenticating on the UE or for authenticating on the UE-R, which can improve efficiency in authenticating the UE and user experience, and reduce complexity and costs of terminals such as the UE-R and the HSS.

Figure 12:
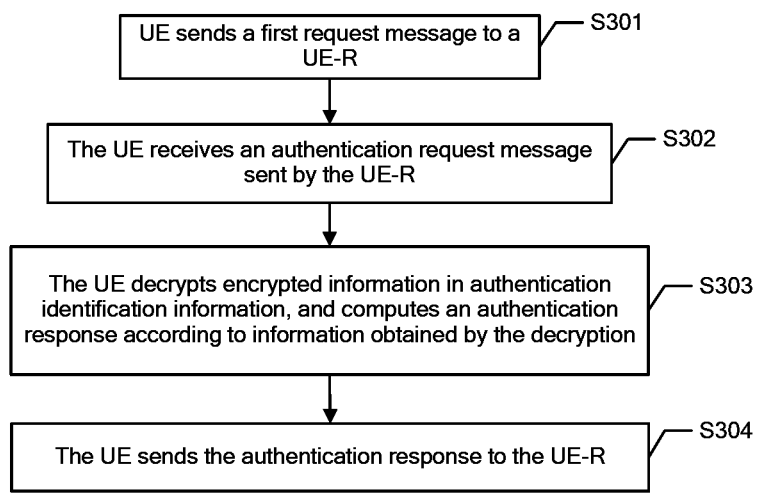
FIG. 12 is a schematic flowchart of a third embodiment of a terminal authenticating method according to an embodiment of the present invention.

Referring to FIG. 12, FIG. 12 is a schematic flowchart of a third embodiment of a terminal authenticating method according to an embodiment of the present invention. The terminal authenticating method described in this embodiment includes steps:

S301. UE sends a first request message to a UE-R.

S302. The UE receives an authentication request message sent by the UE-R.

S303. The UE decrypts encrypted information in an authentication identification information, and computes an authentication response according to information obtained by the decryption.

S304. The UE sends the authentication response to the UE-R.

In some feasible implementation manners, when the UE is not covered by an EPC network signal, but the UE-R is covered by an EPC network signal, the UE may access a network by using the UE-R, and further may implement short-distance communication with another UE.

In specific implementation, when the UE accesses the network by using the UE-R, the network needs to perform verification on the UE, and the UE can be allowed to access the network only after the verification succeeds. Specifically, when a network side performs authentication on the UE, the UE may send a request message to the UE-R, that is, the UE may send the first request message to the UE-R, where the first request message may include identification information (that is, an Indication) for authenticating on the UE, as shown in FIG. 3. After the UE sends the request message to the UE-R, the UE-R may send a request message to a control network element on the network side according to the request message sent by the UE, so as to send the identification information (for example, the Indication) of the UE to an HSS on the network side, so that the HSS sets an authentication vector for authenticating on the UE.

In some feasible implementation manners, after receiving an authentication data request message sent by the control network element, when it is determined that the authentication data request message is a request that is sent by the UE for accessing the network by using the UE-R, the HSS may compute the authentication vector for authenticating on the UE, identify, by using a method for setting a parameter in the authentication vector, that the authentication vector is for authenticating on the UE, and further send, by using the control network element to the UE-R, the authentication request message that includes the authentication identification information for authenticating on the UE. After receiving the authentication request message sent by the control network element, if it is determined that the authentication request message is for authenticating on the UE, the UE-R may send an authentication request message to the UE. After receiving the authentication request message sent by the UE-R, the UE may obtain an authentication response according to the authentication request message. In specific implementation, the authentication request sent by the UE-R to the UE may include an authentication parameter requested by the UE-R from the HSS according to the first request message sent by the UE, that is, an authentication parameter included in the authentication vector that is for authenticating on the UE and is set by the HSS according to the authentication data request sent by the control network element. As shown in FIG. 3, after receiving the authentication request message sent by the UE-R, the UE may verify correctness of an AUTN parameter in the authentication request, and compute a RES parameter after it is verified that the AUTN is correct, where the authentication request message carries the authentication identification information, and the UE may perform verification on the authentication identification information, and further compute the authentication response according to the authentication identification information. After obtaining the RES parameter according to the authentication parameter, the UE may use the RES parameter as an authentication response message of the UE, and send the RES parameter to the UE-R, so as to send the authentication response to the control network element by using the UE-R and complete authentication on the UE by using the control network element.

In some feasible implementation manners, when an authentication parameter in the authentication identification information included in the authentication request message received from the UE-R by the UE includes encrypted information, as shown in FIG. 7, after receiving the authentication request message sent by the UE-R, the UE may parse the authentication identification information in the authentication request message, and determine whether the Xth bit of the AMF parameter in the AUTN parameter in the authentication identification information is 1. If it is determined that the Xth bit of the AMF parameter is 1, the UE may decrypt the encrypted information (RAND* parameter) in the authentication parameter to learn a plaintext RAND parameter, perform verification on the AUTN parameter in the authentication parameter, and further obtain an authentication response by computing according to information such as the plaintext RAND parameter obtained by the decryption and the authentication parameter in the authentication identification information. Specifically, after the UE decrypts the encrypted information (RAND*) to obtain the plaintext RAND parameter, and learns, by performing verification on the AUTN parameter, that the AUTN parameter is correct, the UE may compute the RES parameter, and use the RES parameter as the authentication response of the UE and send the RES parameter to the UE-R.

In this embodiment of the present invention, when accessing a network by using a UE-R, UE may send a request message to the UE-R, acquire, by using the UE-R, information such as an authentication parameter in an authentication vector sent by a network side, after verifying correctness of the authentication parameter sent by the UE-R, computes a RES parameter, and then send the RES parameter to the network side by using the UE-R so as to complete authentication on the UE. In this embodiment of the present invention, when the authentication parameter sent by the network side includes encrypted information, the UE may further decrypt the encrypted information to obtain a plaintext when it is determined that the received parameter includes the encrypted information, then perform verification on another parameter, and further compute an authentication response according to the plaintext obtained by decryption and the authentication parameter, which can improve efficiency and security of authentication on the UE. In addition, neither the UE nor the UE-R needs to support a new protocol. Operations are simple, and complexity and costs of terminals such as the UE and the UE-R are reduced.

Figure 13:
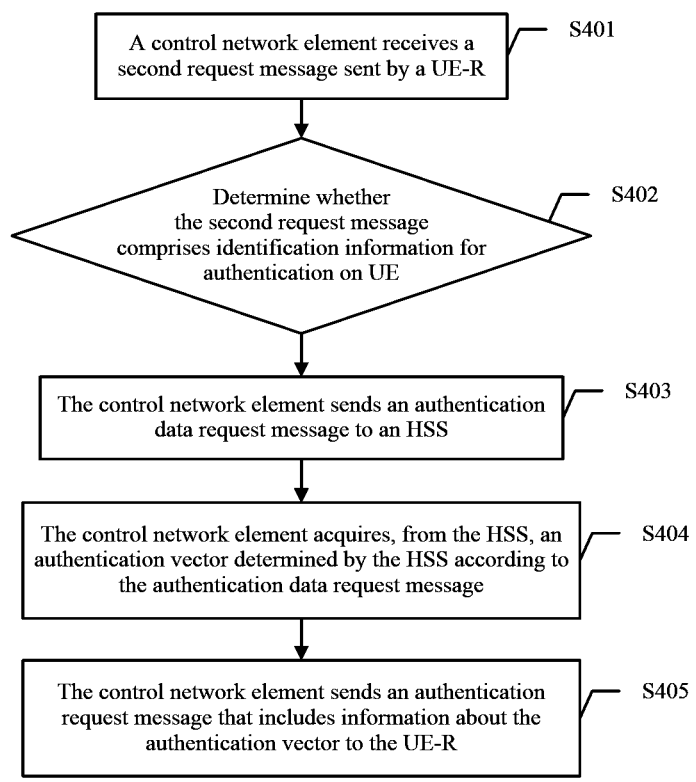
FIG. 13 is a schematic flowchart of a fourth embodiment of a terminal authenticating method according to an embodiment of the present invention.

FIG. 13 is a schematic flowchart of a fourth embodiment of a terminal authenticating method according to an embodiment of the present invention. The terminal authenticating method described in this embodiment includes steps:

S401. A control network element receives a second request message sent by a UE-R.

S402. Determine whether the second request message includes identification information for authenticating on UE, and if a result of the determining is yes, perform step S403.

S403. The control network element sends an authentication data request message to an HSS.

In some feasible implementation manners, authentication objects described in this embodiment of the present invention may include the UE and the UE-R. The UE is used as an example in the following to describe, in detail, the terminal authenticating method provided in this embodiment of the present invention. The control network element described in this embodiment of the present invention is the MME described in the embodiments of the present invention. In some feasible implementation manners, the MME network element described in this embodiment of the present invention may be a function control network element in a ProSe service. The terminal authenticating method described in this embodiment of the present invention is described in detail in the following by using the control network element as an execution body.

In some feasible implementation manners, the second request message received by the control network element from the UE-R includes the identification information (that is, an Indication) for authenticating on the UE and an IMSI. As shown in FIG. 3, when the second request message received by the control network element from the UE-R includes the Indication, the control network element may send the authentication data request message to the HSS according to the IMSI and the Indication. When the second request message received by the control network element from the UE-R includes an identity (an IMSI) of the UE and a message type of the second request message, the control network element may perform matching between the message type of the second request message and a specified message type, and determine whether the second request message is of the specified message type. If the message type of the second request message is the specified message type, the control network element may send the authentication data request message to the HSS. After determining that the message type of the second request message is the specified message type, the control network element may add the identification information for authenticating on the UE to the authentication data request message, as shown in FIG. 5 and FIG. 9. The identification information for authenticating on the UE may be identification information (an Indication) that is for authenticating on the UE and is carried in the second request message, or identification information (an Indication) added to the authentication data request message by the control network element after it is determined that the message type of the second request message is the specified message type. The Indication carried in the second request message and the Indication added to the authentication data request message by the control network element may be a same Indication or may be different Indications, but both may be used to identify that the authentication data request message is an authentication data request message that is sent by using the control network element by the UE for accessing a network by using the UE-R.

S404. The control network element acquires, from the HSS, an authentication vector determined by the HSS according to the authentication data request message.

S405. The control network element sends an authentication request message that includes information about the authentication vector to the UE-R.

In some feasible implementation manners, as shown in FIG. 3, when the second request message received by the control network element from the UE-R includes the Indication (identification information for authenticating on the UE), and when it is determined that the second request message includes the Indication, the control network element may send the authentication data request message to the HSS. Alternatively, as shown in FIG. 5 and FIG. 9, after the control network element determines, according to the received second request message, that the message type of the second request message is the specified message type, the control network element may add, to the authentication data request message, identification information Indication for authenticating on the UE, further send the authentication data request message that includes the IMSI and Indication of the UE to the HSS, and acquire the authentication vector that is set by the HSS and includes authentication identification information for authenticating on the UE. After acquiring, from the HSS, the authentication vector for authenticating on the UE, the control network element may send the authentication request message to the UE-R, so as to send the authentication request message for authenticating on the UE to the UE by using the UE-R.

Figure 14:
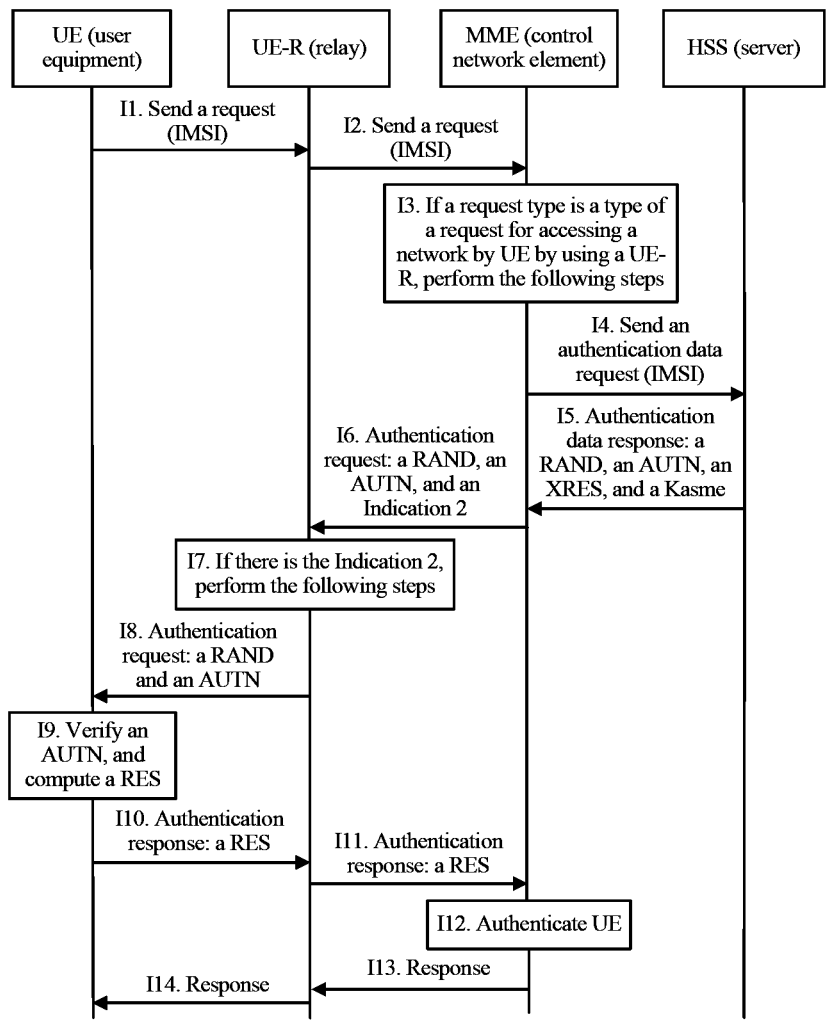
FIG. 14 is a ninth schematic interaction diagram of a terminal authenticating method according to an embodiment of the present invention.

In some feasible implementation manners, as shown in FIG. 10, when the second request message received by the control network element from the UE-R includes an Indication 1 (identification information for authenticating on the UE), after it is determined, according to the second request message, that the second request message includes the identification information Indication 1 for authenticating on the UE, the control network element may send the authentication data request message that includes the IMSI of the UE to the HSS, that is, the authentication data request message does not include the identification information Indication 1 for authenticating on the UE. After receiving the authentication data request message that includes only the IMSI of the UE, the HSS may directly compute an authentication vector in a manner of computing the authentication vector during authentication on the UE-R, that is, in this case, the HSS cannot differentiate between authentication on the UE and authentication on the UE-R, and therefore, the HSS cannot make authentication identification information by setting the authentication vector obtained by computing, and does not perform encryption protection on the authentication vector either, but directly sends the authentication vector obtained by processing to the control network element. After the control network element receives the authentication vector sent by the HSS, in order that the UE-R can identify that an authentication vector message sent by the control network element is for authenticating on the UE but not for authenticating on the UE-R, after receiving the authentication vector sent by the HSS, the control network element may add identification information (an Indication 2) to the authentication vector set by the HSS, and further send an authentication request message that includes the identification information Indication 2 to the UE-R. The identification information Indication 2 indicates that the authentication request message is an authentication request message for authenticating on the UE. Specifically, the Indication 2 may be a new field added to the authentication request message, or may be an idle field in the authentication request message. The Indication 2 may be new identification information selected by the MME, or may be identification information sent by the UE to the UE-R, or may be identification information sent by the UE-R to the MME, or may be identification information sent by the MME to the HSS. In specific implementation, as shown in FIG. 14, when the second request message received by the control network element from the UE-R includes only the IMSI of the UE, and does not include the identification information Indication (or the Indication 1) for authenticating on the UE, the control network element may determine, according to the message type of the second request message, whether the message type of the second request message is the specified message type. After determining that the second request message includes the identification information for authenticating on the UE (which may specifically be the Indication in FIG. 3 or the Indication 1 in FIG. 10) or the message type of the second request message is the specified message type, the control network element may also send the authentication data request message to the HSS, where the authentication data request message does not include the identification information for authenticating on the UE. After receiving the authentication data request message that includes only the IMSI of the UE (that is, the identification information for authenticating on the UE is not included), the HSS may directly compute an authentication vector in a manner of computing the authentication vector during authentication on the UE-R, and send the authentication vector obtained by processing to the control network element. After receiving an authentication response message that is sent by the HSS and includes the authentication vector and before sending the authentication vector to the UE-R by using the authentication request message, the control network element may add the identification information (for example, the Indication 2) to the authentication request message, and send, to the UE-R by using the authentication request message, the information such as the authentication vector that includes the identification information Indication 2. As shown in FIG. 14, after receiving an authentication vector message sent by the HSS, the control network element may add the identification information (the Indication 2) to the authentication request message set by the HSS, and send, to the UE-R, the authentication request message that includes the Indication 2 and the authentication vector (including a RAND and an AUTN) set by the HSS. Specifically, the control network element may send an authentication request that includes the identification information Indication 2 and the authentication vector to the UE-R, so as to inform, by using the Indication 2, that the authentication request message is a request message for authenticating on the UE.

In some feasible implementation manners, after the control network element sends the authentication request message for authenticating on the UE to the UE-R, the UE-R may send, according to the authentication request message, an authentication request message to the UE, and send, to the UE, the information such as the RAND and AUTN set by the HSS. The UE may perform verification on an authentication parameter included in the authentication vector in the authentication request message, compute a parameter RES, and further send the RES parameter to the UE-R by using an authentication response. After receiving the authentication response message sent by the UE, the UE-R may send the authentication response message that includes the RES parameter to the control network element. After receiving the authentication response message, the control network element may compare the RES parameter in the authentication response message with a prestored XRES in the authentication vector sent by the HSS, to determine whether the RES and the XRES are consistent. If a result of the determining is yes, it may be determined that the UE is UE that is allowed to access a network, that is, authentication on the UE may be completed by using the authentication request of the UE.

In this embodiment of the present invention, a control network element may determine, according to a second request message sent by a UE-R, whether the second request message includes identification information for authenticating on UE or whether a message type of the second request message is a specified message type, when the second request message includes the identification information for authenticating on the UE or the message type of the second request message is the specified message type, send an authentication data request message to an HSS, acquire, from the HSS, authentication identification information such as an authentication vector for authenticating on the UE, and further send an authentication request message that includes the authentication identification information to the UE-R, so as to send the authentication identification information to the UE by using the UE-R. The control network element in this embodiment of the present invention may send the authentication data request message that includes identification information for authenticating on the UE to the HSS, or send the authentication request message that includes the authentication identification information to the UE-R, which can improve efficiency in authenticating the UE, reduce complexity and costs of terminals such as the UE-R and the UE, and improve user experience of authentication on the UE.

Figure 15:
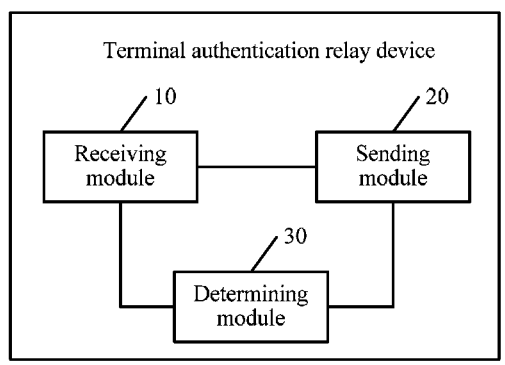
FIG. 15 is a schematic structural diagram of an embodiment of a terminal authentication relay device according to an embodiment of the present invention.

Referring to FIG. 15, FIG. 15 is a schematic structural diagram of an embodiment of a terminal authentication relay device according to an embodiment of the present invention. The relay device described in this embodiment includes:

a receiving module 10, configured to receive a first request message sent by UE;

a sending module 20, configured to send a second request message to a control network element according to the first request message sent by the UE, so that the control network element sends an authentication data request message to an HSS according to the second request message, where the authentication data request message carries identification information for authenticating on the UE; where the receiving module 10 is configured to receive an authentication request message sent by the control network element; and a determining module 30, configured to determine, according to the authentication request message received by the receiving module, whether the authentication request message is for authenticating on the UE; where the sending module 20 is configured to: when a result of the determining by the determining module is yes, send an authentication request message to the UE, where the authentication request message includes an authentication parameter of the UE;

the receiving module 10 is further configured to receive an authentication response message that is sent by the UE according to the authentication request message sent by the sending module; and the sending module 20 is configured to send, to the control network element, the authentication response message received by the receiving module, so as to complete authentication on the UE by using the control network element.

In some feasible implementation manners, the first request message that is sent by the UE and received by the receiving module 10 includes the identification information for authenticating on the UE; and the sending module 20 is further specifically configured to:

add, to the second request message, the identification information for authenticating on the UE that is carried in the first request message, and send the second request message to the control network element.

In specific implementation, the UE-R described in the embodiments of the present invention is the terminal authentication relay device described in this embodiment of the present invention.

In some feasible implementation manners, the first request message that is sent by the UE and received by the receiving module 10 may include an identity (an IMSI) of the UE and identification information (an Indication) (that is, identification information for authenticating on the UE) of the UE. The identification information Indication may indicate that the first request message is a request that is sent by the UE for accessing a network by using the UE-R. In specific implementation, after the receiving module 10 of the UE-R receives the first request message that is sent to the UE-R by the UE for accessing the network by using the UE-R and includes the IMSI and Indication of the UE, the sending module 20 of the UE-R may send the second request message to the control network element according to the first request message that is sent by the UE and received by the receiving module 10. Specifically, a message type of the second request message and a message type of the first request message may be the same or different, which may be specifically set according to an actual scenario requirement for authenticating on the UE. In specific implementation, when sending the second request message to an MME, the sending module 20 may add the identification information for authenticating on the UE to the second request message, where the identification information for authenticating on the UE is used to identify that the second request message is a request message that is sent by the UE-R to the MME when the UE accesses the network by using the UE-R. Specifically, when the first request message that is sent by the UE and received by the receiving module 10 of the UE-R includes the identification information (that is, the Indication) for authenticating on the UE, the sending module 20 may use the identification information Indication as the identification information for authenticating on the UE and add the identification information Indication to the second request message. Alternatively, the sending module 20 may select new identification information, use the selected new identification information as the identification information for authenticating on the UE and add the selected new identification information to the second request message, and further send the second request message to the MME (that is, the control network element). As shown in FIG. 3, when the receiving module 10 of the UE-R receives the first request message sent by the UE, if the first request message received by the receiving module 10 includes the IMSI and Indication of the UE, the sending module 20 of the UE-R may add, to the second request message, the IMSI and Indication of the UE that are included in the first request message; or the sending module 20 may re-select an Indication, and add the IMSI and the re-selected Indication to the second request message. Then, the second request message is sent to the control network element. After receiving, by using the UE-R, the second request message sent by the UE-R, the control network element on a network side may determine, according to the Indication included in the second request message, that authentication currently needs to be performed on the UE that accesses the network by using the UE-R, but not on the UE-R. Then, the MME may send a corresponding user authentication data request message to the HSS.

In some feasible implementation manners, the first request message that is sent by the UE and received by the receiving module 10 does not include the identification information for authenticating on the UE; and the sending module 20 is specifically configured to:

add the identification information for authenticating on the UE to the second request message, and send the second request message to the control network element.

In some feasible implementation manners, as shown in FIG. 4, when the first request message that is sent by the UE and received by the receiving module 10 includes only the IMSI of the UE, and does not include the identification information (an Indication) for authenticating on the UE, after the UE accesses the network by using the UE-R and sends the first request message that includes the IMSI of the UE to the UE-R, the sending module 20 of the UE-R may send the second request message to the control network element according to the first request message sent by the UE. Specifically, the message type of the second request message sent by the sending module 20 and the message type of the first request message may be the same or different, which may be specifically set according to an actual scenario requirement for authenticating on the UE. In specific implementation, as shown in FIG. 4, when the first request message received by the receiving module 10 of the UE-R includes only the IMSI of the UE, the sending module 20 of the UE-R may add the identification information Indication (that is, the identification information for authenticating on the UE) to the first request message sent by the UE, add the IMSI and the Indication to the second request message, and send the second request message that includes the IMSI and Indication of the UE to the control network element. After receiving, by using the UE-R, the second request message sent by the UE-R, the control network element on the network side may determine, according to the Indication of the UE included in the second request message, that authentication currently needs to be performed on the UE that accesses the network by using the UE-R, but not on the UE-R.

In specific implementation, as shown in FIG. 5, when the first request message sent by the UE includes only the IMSI of the UE, after the receiving module 10 receives the first request message that is sent to the UE-R by the UE for accessing the network by using the UE-R and includes the IMSI of the UE, the sending module 20 of the UE-R may send the second request message to the control network element according to the first request message sent by the UE. Specifically, the message type of the second request message sent by the sending module 20 and the message type of the first request message may be the same or different, which may be specifically set according to an actual scenario requirement for authenticating on the UE. In specific implementation, as shown in FIG. 5, when the first request message received by the receiving module 10 of the UE-R includes only the IMSI of the UE, the sending module 20 of the UE-R may directly add the IMSI of the UE in the first request message to the second request message, and send the second request message that includes the IMSI of the UE to the control network element, that is, in the foregoing implementation manner, the second request message sent by the sending module 20 of the UE-R to the control network element includes the IMSI of the UE, and does not include the identification information Indication for authenticating on the UE. In the foregoing implementation manner, after the sending module 20 of the UE-R sends the second request message that includes only the IMSI of the UE to the control network element on the network side, the control network element cannot acquire the Indication directly from the second request message because there is no Indication in the second request message. In this case, the control network element may determine, according to the message type of the second request message, whether the request is an authentication request sent by the UE when the UE accesses the network by using the UE-R or an authentication request sent by the UE-R when the UE-R accesses the network. Specifically, the control network element may perform matching between the message type of the received second request message sent by the sending module 20 and a prestored specified message type, and determine whether the message type of the second request message belongs to the specified message type. If it is determined that the message type of the second request message is the specified message type, the sending module 20 of the control network element may send the corresponding user authentication data request message to the HSS, and may further inform the HSS, by using the user authentication data request message, whether the UE accesses the network or the UE-R accesses the network. That is, the control network element determines, according to determining of the message type of the second request message, whether a message type of the currently received second request message is the specified message type, so as to determine content included in the user authentication data request message sent to the HSS. That is, it may be determined that authentication needs to be performed on the UE that accesses the network by using the UE-R, but not on the UE-R.

In some feasible implementation manners, after receiving the second request message sent by the sending module 20 of the UE-R, the network side may compute, according to the second request message, an authentication vector used for performing authentication on the UE. In specific implementation, as shown in FIG. 3 or FIG. 4, when the second request message that is sent by the sending module 20 of the UE-R and received by the control network element on the network side includes the identification information Indication, it may be determined that the second request message is a request that is sent by the UE for accessing the network by using the UE-R, but not a request for accessing the network by the UE-R, that is, when it is determined that the second request message includes the Indication, the network side may compute the authentication vector used for performing authentication on the UE. Specifically, when it is determined that the second request message includes the Indication, the network side may set authentication identification information (that is, authentication identification information for authenticating on the UE) in the authentication vector used for performing authentication on the UE, where the authentication identification information is used to indicate that the authentication vector is for authenticating on the UE, and send the authentication vector that includes the authentication identification information to the UE-R by using an authentication request message. When setting the authentication identification information for authenticating on the UE, the network side may set, in an AMF parameter in the authentication vector, the authentication identification information for authenticating on the UE. For example, the Xth bit of an AMF parameter may be set to 1 in an AUTN parameter in the authentication vector, where 1≤X≤7, that is, the Xth bit of the AMF parameter may be any one of seven idle bits of the AMF parameter. The network side sets the flag bit, and sends an authentication vector that includes the flag bit to the UE-R, and the UE-R then may determine, according to the flag bit, that the received authentication vector is used for authenticating on the UE but not for authenticating on the UE-R.

In specific implementation, when the second request message received by the network side does not include the identification information Indication, the network side may further determine, according to the message type of the second request message, that the second request message is a request message that is sent by the UE for accessing the network by using the UE-R, but not a request message that is sent by the UE-R for accessing the network. When it is determined that the received second request message is a request message that is sent by the UE for accessing the network by using the UE-R, the network side may compute the authentication vector used for performing authentication on the UE, set, in the authentication vector, the authentication identification information for authenticating on the UE, and further, send authentication vector parameters RAND and AUTN that include the identification information for authenticating on the UE to the UE-R.

In some feasible implementation manners, the authentication request message that is sent by the control network element and received by the receiving module 10 includes authentication identification information that is for authenticating on the UE and is set by the HSS according to the identification information for authenticating on the UE; and the determining module 30 is specifically configured to: determine whether the authentication request message includes the authentication identification information; and if the authentication request message includes the authentication identification information, determine that the authentication request message is for authenticating on the UE.

In some feasible implementation manners, after the receiving module 10 of the UE-R receives the authentication request message sent by the control network element on the network side, the determining module 30 may determine, according to various parameter information of the authentication vector included in the authentication request message received by the receiving module 10, whether the authentication request message is for authenticating on the UE. If the determining module 30 determines that the authentication request message is for authenticating on the UE, the sending module 20 of the UE-R sends the authentication request message to the UE. In specific implementation, when the receiving module 10 of the UE-R receives the authentication request message sent by the control network element, the determining module 30 of the UE-R may determine whether the authentication request message includes the authentication identification information for authenticating on the UE. For example, the determining module 30 of the UE-R may determine whether the Xth bit of the AMF parameter of the authentication vector in the authentication request message is 1. If it is determined that the Xth bit of the AMF in the authentication vector is 1, the determining module 30 determines that the authentication request message is for authenticating on the UE. Specifically, as shown in FIG. 10, the determining module 30 of the UE-R may further determine whether the authentication request message includes identification information Indication 2. If there is the identification information Indication 2, it is determined that the authentication request message is for authenticating on the UE. Then, the sending module 20 may send the authentication request message to the UE, and send parameters such as the AUTN and the RAND in the authentication vector to the UE, so as to be verified by the UE.

In some feasible implementation manners, when sending the authentication request message to the UE, the sending module 20 of the UE-R may send, to the UE, the authentication vector received from the network side. After receiving the authentication vector parameters RAND and AUTN that are sent by the UE-R, the UE may perform verification on the parameters RAND and AUTN in the authentication vector, to verify correctness of the AUTN parameter. After it is verified that the AUTN is correct, the UE may compute a RES parameter, and send, to the UE-R, the RES parameter obtained by computing. After receiving the authentication response (including the RES parameter) sent by the UE, the UE-R may send the authentication response to the control network element on the network side, so as to complete authentication on the UE by using the control network element.

In this embodiment of the present invention, a UE-R may receive a request message sent by UE, send an authentication request message to a network side according to the request message sent by the UE, and acquire, from the network side, an authentication vector that includes authentication identification information for authenticating on the UE. The UE-R may determine, according to an authentication request message sent by the network side, whether to perform authentication on the UE or the UE-R, and further send the authentication request message to the UE, so as to complete authentication on the UE. Operations are simple, costs of a terminal are low, and efficiency in authenticating the UE and user experience are improved.

Figure 16:
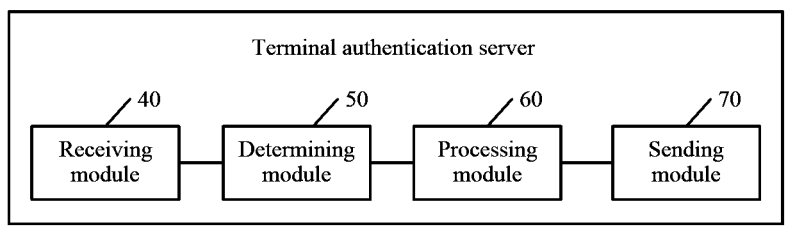
FIG. 16 is a schematic structural diagram of an embodiment of a terminal authentication server according to an embodiment of the present invention.

Referring to FIG. 16, FIG. 16 is a schematic structural diagram of an embodiment of a terminal authentication server according to an embodiment of the present invention. The server described in this embodiment includes:
a receiving module 40, configured to receive an authentication data request message sent by a control network element;
a determining module 50, configured to determine, according to the authentication data request message received by the receiving module, whether the authentication data request message includes identification information for authenticating on UE;
a processing module 60, configured to: when a result of the determining by the determining module 50 is yes, set, in an authentication vector, authentication identification information for authenticating on the UE; and
a sending module 70, configured to send, to the control network element, the authentication vector obtained by processing by the processing module, so as to send the authentication identification information to a UE-R by using the control network element, so that the UE-R determines, according to the authentication identification information, whether to perform authentication on the UE.

In some feasible implementation manners, the authentication vector obtained by processing by the processing module 60 includes a RAND parameter, an AUTN parameter, an XRES parameter, and a Kasme parameter; and
the processing module 60 is specifically configured to:
set the authentication identification information in an AMF parameter in the AUTN parameter in the authentication vector.

In specific implementation, the HSS described in the embodiments of the present invention is the terminal authentication server described in this embodiment of the present invention.

In some feasible implementation manners, after the receiving module 40 of the HSS on a network side receives the authentication data request message sent by the control network element, the determining module 50 may determine whether the authentication data request message includes the identification information for authenticating on the UE, where the identification information for authenticating on the UE may specifically be an Indication carried in a first request message sent by the UE to a UE-R, and the UE-R adds, to a second request message, the Indication carried in the first request message, further sends the second request message to the control network element, and sends the second request message to the HSS by using the control network element. Alternatively, the identification information for authenticating on the UE may be an Indication added when the UE-R sends the second request message to the control network element according to the first request message. After adding the Indication to the second request message, the UE-R sends the second request message to the control network element, and the control network element may send, to the HSS, the Indication carried in the second request message; the identification information for authenticating on the UE may be Indication selected for the control network element. As shown in FIG. 3, FIG. 4, or FIG. 5, after the receiving module 40 of the HSS receives the authentication data request message sent by the control network element, the determining module 50 may determine whether the authentication data request message includes the identification information for authenticating on the UE, that is, whether there is the Indication in the authentication data request message. If it is determined that the authentication data request message includes the Indication, the determining module 50 may determine that an authentication object of the authentication data request message is the UE. In specific implementation, when the determining module 50 of the HSS determines that the authentication object corresponding to the authentication data request message is the UE, the processing module 60 may compute an authentication vector message corresponding to the authentication data request message, that is, an authentication vector message for authenticating on the UE, and may set, in the authentication vector message, the authentication identification information for authenticating on the UE. Specifically, the authentication vector message obtained by processing by the processing module 60 may include parameters such as a RAND, an AUTN, an XRES, and a Kasme. When determining the parameters in the authentication vector for authenticating on the UE, the processing module 60 of the HSS may set, in an AMF parameter in the AUTN parameter, authentication identification information for authenticating on the UE, where the authentication identification information is used to indicate that the authentication vector is for authenticating on the UE. As shown in FIG. 3, FIG. 4, or FIG. 5, the processing module 60 may set the Xth bit of the AMF parameter as a flag bit used for authenticating on the UE. For example, the Xth bit of the AMF parameter is set to 1, which is used as the authentication identification information for authenticating on the UE, where the Xth bit of the AMF parameter is any one of seven idle bits of the AMF parameter, that is, $1 \leq X \leq 7$.

In some feasible implementation manners, after the processing module 60 of the HSS determines the authentication vector message for authenticating on the UE, and sets the authentication identification information for authenticating on the UE, the sending module 70 may send, to the control network element by using an authentication response message, the authentication vector that includes the authentication identification information for authenticating on the UE, so as to send, by using the control network element, the authentication vector to the UE-R by using an authentication request message. After receiving the authentication request message sent by the control network element, the UE-R may determine, according to the authentication identification information that is for authenticating on the UE and is in the authentication vector included in the authentication request message, that the authentication vector is for authenticating on the UE, but not for authenticating on the UE-R, and may further send a corresponding authentication parameter in the authentication vector to the UE, so as to implement authentication on the UE.

In some feasible implementation manners, the authentication vector obtained by processing by the processing module 60 includes a RAND parameter, an AUTN parameter, an XRES parameter, and a Kasme parameter; and
the processing module 60 is further specifically configured to:
encrypt the RAND parameter in the authentication vector; and
set the authentication identification information in an AMF parameter in the AUTN parameter in the authentication vector.

In some feasible implementation manners, as shown in FIG. 7 or FIG. 8, after the receiving module 40 of the HSS receives the authentication data request message sent by the control network element, if the determining module 50 determines that the authentication data request message includes the identification information for authenticating on the UE, that is, there is the Indication in the authentication data request message, the processing module 60 may compute the authentication vector for authenticating on the UE, and set the Xth bit of the AMF parameter in the AUTN parameter of the authentication vector, so as to set the authentication identification information for authenticating on the UE. In addition, as shown in FIG. 9, after the HSS receives the authentication data request message sent by the control network element, if it is determined that the authentication data request message includes the identification information for authenticating on the UE, that is, there is the Indication in the authentication data request message, the processing module 60 of the HSS may further encrypt the RAND parameter in the authentication vector, and set the Xth bit of the AMF parameter as a flag bit for encrypting the RAND parameter. That the Xth bit of the AMF is set to 1 is used as identification information for encrypting the RAND parameter to obtain an encrypted RAND parameter (RAND*). That is, the processing module 60 may set that the Xth bit of the AMF parameter is 1 as encrypted in the RAND parameter, and adding the authentication identification information for authenticating on the UE to the authentication vector. When the UE-R receives the authentication vector, if it is determined that the Xth bit of the AMF parameter in the authentication vector is 1, it may be determined that the authentication vector is an authentication vector for authenticating on the UE. The UE-R may send an authentication request to the UE, and send the RAND* parameter and the AUTN parameter in the authentication vector to the UE. After receiving parameter information of the authentication vector, if it is determined that the Xth bit of the AMF parameter in the AUTN parameter is 1, the UE may decrypt the RAND* parameter and then may perform verification on the AUTN. That is, when computing the authentication vector for authenticating on the UE, the HSS may set, by using a setting method, the authentication identification information for authenticating on the UE, and may further protect the parameter RAND in the authentication vector by using an encryption method at the same time, which can improve efficiency in authenticating the UE and a user experience effect.

In some feasible implementation manners, if the authentication data request message that is sent by the control network element and received by the receiving module 40 of the HSS does not include the identification information for authenticating on the UE, that is, does not include the Indication, as shown in FIG. 10 or FIG. 11, the processing module 60 of the HSS may compute, according to a method for performing authentication on the UE-R, the authentication vector for authenticating on the UE and does not perform setting or encryption on the authentication vector; and directly sends, by using the sending module 70 to the control network element, an authentication data response message that includes the authentication vector, so as to process the authentication data response message by using the control network element and send the authentication request message to the UE-R by using the control network element. The UE-R may determine, according to the authentication vector processed by using the control network element, whether the authentication request message is for authenticating on the UE or for authenticating on the UE-R.

In this embodiment of the present invention, after receiving an authentication data request sent by a control network element, the HSS described in this embodiment of the present invention may compute, according to the received authentication data request, an authentication vector for authenticating on UE, and may further set a parameter in the authentication vector so as to identify a message, or encrypt a parameter in the authentication vector to protect the parameter. A UE-R may determine, by using the authentication vector sent by the HSS, whether the authentication vector is for authenticating on the UE or for authenticating on the UE-R, which can improve efficiency in authenticating the UE and user experience and reduce complexity and costs of terminals such as the UE-R and the HSS.

Figure 17:
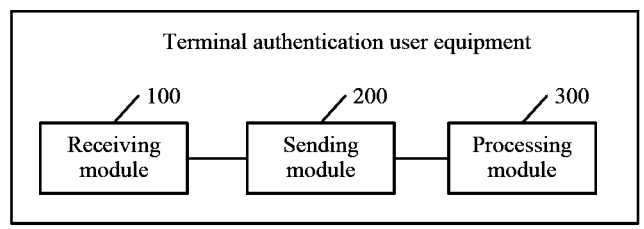
FIG. 17 is a schematic structural diagram of an embodiment of terminal authentication user equipment according to an embodiment of the present invention.

Referring to FIG. 17, FIG. 17 is a schematic structural diagram of an embodiment of terminal authentication user equipment according to an embodiment of the present invention. The user equipment described in this embodiment includes:
a sending module 100, configured to send a first request message to a UE-R, so that the UE-R sends a second request message to a control network element according to the first request message;
a receiving module 200, configured to receive an authentication request message sent by the UE-R, where the authentication request message carries authentication identification information for authenticating on the UE; and
a processing module 300, configured to decrypt encrypted information in the authentication identification information, and compute an authentication response according to information obtained by the decryption.

In some feasible implementation manners, the first request message sent by the sending module 100 includes the identification information for authenticating on the UE.

In specific implementation, the UE described in the embodiments of the present invention is the terminal authentication user equipment described in this embodiment of the present invention.

In some feasible implementation manners, when the UE is not covered by an EPC network signal, but the UE-R is covered by an EPC network signal, the UE may access a network by using the UE-R, and further may implement short-distance communication with another UE.

In specific implementation, when the UE accesses the network by using the UE-R, the network needs to perform verification on the UE, and the UE can be allowed to access the network only after the verification succeeds. Specifically, when a network side performs authentication on the UE, the sending module 100 of the UE may send a request message to the UE-R, that is, the UE may send the first request message to the UE-R, where the first request message may include identification information (that is, Indication) for authenticating on the UE, as shown in FIG. 3. After the sending module 100 of the UE sends the request message to the UE-R, the UE-R may send a request message to a control network element on the network side according to the request message sent by the UE, so as to send the identification information (for example, the Indication) of the UE to an HSS on the network side, so that the HSS sets an authentication vector for authenticating on the UE.

In some feasible implementation manners, after receiving an authentication data request message sent by the control network element, when it is determined that the authentication data request message is a request that is sent by the UE for accessing the network by using the UE-R, the HSS may compute the authentication vector for authenticating on the UE, identify, by using a method for setting a parameter in the authentication vector, that the authentication vector is for authenticating on the UE, and further send, by using the control network element to the UE-R, the authentication request message that includes the authentication identification information for authenticating on the UE. After receiving the request message sent by the control network element, if it is determined that the authentication request message is for authenticating on the UE, the UE-R may send an authentication request message to the UE. After receiving the authentication request message sent by the UE-R, the receiving module 200 of the UE may obtain an authentication response of the UE according to the authentication request message. In specific implementation, the authentication request that is sent by the UE-R to the UE and received by the receiving module 200 of the UE may include an authentication parameter requested by the UE-R from the HSS according to the first request message sent by the UE, that is, an authentication parameter included in the authentication vector that is for authenticating on the UE and is set by the HSS according to the authentication data request sent by the control network element. As shown in FIG. 3, after the receiving module 200 of the UE receives the authentication request message sent by the UE-R, the processing module 300 may verify correctness of an AUTN parameter in the authentication request, and compute a RES parameter after it is verified that the AUTN is correct, where the authentication request message carries the authentication identification information, and the UE may perform verification on the authentication identification information, and further compute the authentication response according to the authentication identification information. After learning the RES parameter according to the authentication parameter, the processing module 300 of the UE may use the RES parameter as an authentication response of the UE, and send the RES parameter to the UE-R by using the sending module 100, so as to send the authentication response to the control network element by using the UE-R and complete authentication on the UE by using the control network element.

In some feasible implementation manners, when an authentication parameter in the authentication identification information included in the authentication request message received from the UE-R by the receiving module 200 of the UE includes encrypted information, as shown in FIG. 7, after the receiving module 200 receives the authentication request message sent by the UE-R, the processing module 300 may determine and parse the authentication identification information in the authentication request message, and determine whether the Xth bit of the AMF parameter in the AUTN parameter in the authentication identification information is 1. If it is determined that the Xth bit of the AMF parameter is 1, the processing module 300 may decrypt the encrypted information (RAND* parameter) in the authentication parameter to learn a plaintext RAND parameter, perform verification on the AUTN parameter in the authentication parameter, and further obtain an authentication response by computing according to information such as the plaintext RAND parameter obtained by the decryption and the authentication parameter in the authentication identification information. Specifically, after the processing module 300 of the UE decrypts the encrypted information (RAND*) to obtain the plaintext RAND parameter, and learns, by performing verification on the AUTN parameter, that the AUTN parameter is correct, the processing module 300 of the UE may compute the RES parameter, and use the RES parameter as the authentication response of the UE and send the RES parameter to the UE-R by using the sending module 100.

When accessing a network by using a UE-R, the UE described in this embodiment of the present invention may send a request message to the UE-R, acquire, by using the UE-R, information such as an authentication parameter in an authentication vector sent by a network side, after verifying correctness of the authentication parameter sent by the UE-R, compute a RES parameter, and then send the RES parameter to the network side by using the UE-R so as to complete authentication on the UE. When the authentication parameter that is sent by the network side and received by the UE described in this embodiment of the present invention includes encrypted information, the UE may further decrypt the encrypted information to obtain a plaintext when it is determined that the received parameter includes the encrypted information, then perform verification on another parameter, and further compute an authentication response according to the plaintext obtained by decryption and the authentication parameter, which can improve security of authentication on the UE. In addition, neither the UE nor the UE-R needs to support a new protocol. Operations are simple, and complexity and costs of terminals such as the UE and the UE-R are reduced.

Figure 18:
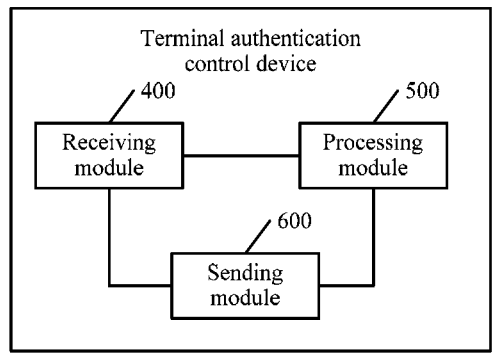
FIG. 18 is a schematic structural diagram of an embodiment of a terminal authentication control device according to an embodiment of the present invention.

Referring to FIG. 18, FIG. 18 is a schematic structural diagram of an embodiment of a terminal authentication control device according to an embodiment of the present invention. The control device described in this embodiment includes:

a receiving module 400, configured to receive a second request message sent by a UE-R;

a processing module 500, configured to determine, according to the second request message received by the receiving module, whether the second request message includes identification information for authenticating on UE; and a sending module 600, configured to when a result of the determining by the processing module is yes, send an authentication data request message to an HSS, where the authentication data request message carries the identification information for authenticating on the UE; where the receiving module 400 is configured to acquire, from the HSS, an authentication vector determined by the HSS according to the authentication data request message; and the sending module 600 is further configured to send, to the UE-R, an authentication request message that includes information about the authentication vector and is received by the receiving module, so that the UE-R determines whether the authentication request message is for authenticating on the UE.

Figure 19:
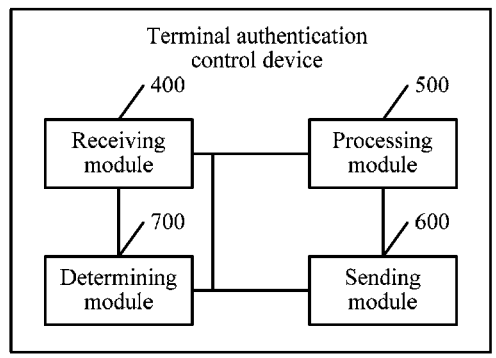
FIG. 19 is another schematic structural diagram of an embodiment of a terminal authentication control device according to an embodiment of the present invention.

In some feasible implementation manners, the control device (as shown in FIG. 19) further includes:
a determining module 700, configured to determine, according to the second request message received by the receiving module, whether the second request message is of a specified message type; and if the second request message is of the specified message type, instruct the sending module to send the authentication data request message to the HSS.

In specific implementation, the terminal authentication control device provided in this embodiment of the present invention may be the MME described in the embodiments of the present invention, or may be a function control network element in a Prose service, that is, the control network element described in the embodiments of the present invention is the terminal authentication control device provided in this embodiment of the present invention. That the MME is the terminal authentication control device provided in this embodiment of the present invention is used for detailed description in the following.

In some feasible implementation manners, the second request message received by the receiving module 400 of the MME from the UE-R may include an identity (an IMSI) of the UE and the identification information (that is, an Indication) for authenticating on the UE. As shown in FIG. 3, when the second request message received by the receiving module 400 from the UE-R includes the Indication, the processing module 500 may send the authentication data request message to the HSS according to the IMSI and the Indication.

In some feasible implementation manners, when the second request message received by the receiving module 400 from the UE-R includes the identity (the IMSI) of the UE and a message type of the second request message, the determining module 700 may perform matching between the message type of the second request message and a specified message type, and determine whether the second request message is of the specified message type. If the message type of the second request message is the specified message type, the control network element may send the authentication data request message to the HSS. After the determining module 700 determines that the message type of the second request message is the specified message type, the sending module 600 may add the identification information for authenticating on the UE to the authentication data request message, as shown in FIG. 5 and FIG. 9. The identification information for authenticating on the UE may be identification information (an Indication) that is for authenticating on the UE and is carried in the second request message, or identification information (an Indication) added to the authentication data request message by the control network element after it is determined that the message type of the second request message is the specified message type. The Indication carried in the second request message and the Indication added to the authentication data request message by the control network element may be a same Indication or may be different Indications, but both may be used to identify that the authentication data request message is an authentication data request message that is sent by using the control network element by the UE for accessing a network by using the UE-R.

In some feasible implementation manners, the sending module 600 is specifically configured to:
add the identification information for authenticating on the UE to the authentication data request message, and send the authentication data request message to the HSS.

In some feasible implementation manners, as shown in FIG. 3, when the second request message received by the receiving module 400 from the UE-R includes the Indication (identification information for authenticating on the UE), and when it is determined that the second request message includes the Indication, the processing module 500 may send the authentication data request message to the HSS. Alternatively, as shown in FIG. 5 and FIG. 9, after the determining module 700 determines, according to the received second request message, that the message type of the second request message is the specified message type, the sending module 600 may add, to the authentication data request message, identification information Indication for authenticating on the UE, further send the authentication data request message that includes the IMSI and Indication of the UE to the HSS, and acquire, from the HSS by using the receiving module 400, the authentication vector that is set by the HSS and includes authentication identification information for authenticating on the UE. After acquiring, from the HSS, the authentication vector for authenticating on the UE, the receiving module 400 may send the authentication request message to the UE-R by using the sending module 600, and send the authentication request message to the UE-R, so as to send the authentication request message for authenticating on the UE to the UE by using the UE-R.

In some feasible implementation manners, the sending module 600 is specifically configured to:
add the identification information for authenticating on the UE to the authentication request message that includes the authentication vector, and send the authentication request message to the UE-R.

In some feasible implementation manners, as shown in FIG. 10, when the second request message received by the receiving module 400 from the UE-R includes an Indication 1 (identification information for authenticating on the UE), after it is determined, according to the second request message, that the second request message includes the identification information Indication 1 for authenticating on the UE, the processing module 500 may send, by using the sending module 600 to the HSS, the authentication data request message that includes the IMSI of the UE, that is, the authentication data request message does not include the identification information Indication 1 for authenticating on the UE. After receiving the authentication data request message that includes only the IMSI of the UE, the HSS may directly compute an authentication vector in a manner of computing the authentication vector during authentication on the UE-R, that is, in this case, the HSS cannot differentiate between authentication on the UE and authentication on the UE-R, and therefore, the HSS cannot make authentication identification information by setting the authentication vector obtained by computing, and does not perform encryption protection on the authentication vector either, but directly sends the authentication vector obtained by processing to the control network element. After the receiving module 400 of the MME receives the authentication vector sent by the HSS, in order that the UE-R can identify that an authentication vector message sent by the control network element is for authenticating on the UE but not for authenticating on the UE-R, after the receiving module 400 receives the authentication vector sent by the HSS, the processing module 500 of the MME may add identification information (an Indication 2) to the authentication vector that is set by the HSS and received by the receiving module 400, and further send, by using the sending module 600 to the UE-R, an authentication request message that includes the identification information Indication 2. The identification information Indication 2 indicates that the authentication request message is an authentication request message for authenticating on the UE. Specifically, the Indication 2 may be a new field added to the authentication request message, or may be an idle field in the authentication request message. The Indication 2 may be new identification information selected by the MME, or may be identification information included in the request message sent by the UE to the UE-R, or may be identification information included in the request message sent by the UE-R to the MME, or may be identification information included in the authentication data request message sent by the MME to the HSS. In specific implementation, as shown in FIG. 14, when the second request message received by the receiving module 400 of the MME from the UE-R includes only the IMSI of the UE, and does not include the identification information Indication (or the Indication 1) for authenticating on the UE, the processing module 500 may determine, according to the message type of the second request message, whether the message type of the second request message is the specified message type. After the processing module 500 determines that the second request message includes the identification information (which may specifically be the Indication in FIG. 3 or the Indication 1 in FIG. 10) for authenticating on the UE or the message type of the second request message is the specified message type, the sending module 600 may send the authentication data request message to the HSS, where the authentication data request message does not include the identification information for authenticating on the UE. After receiving the authentication data request message that includes only the IMSI of the UE (that is, the identification information for authenticating on the UE is not included), the HSS may directly compute an authentication vector in a manner of computing the authentication vector during authentication on the UE-R, and send the authentication vector obtained by processing to the MME. After the receiving module 400 of the MME receives an authentication response message that is sent by the HSS and includes the authentication vector and before the sending module 600 sends the authentication vector to the UE-R by using the authentication request message, the processing module 500 may add the identification information (for example, the Indication 2) for authenticating on the UE to the authentication request message, and send, to the UE-R by using the sending module 600, the information such as the authentication vector that includes the identification information Indication 2. As shown in FIG. 14, after the receiving module 400 receives an authentication vector message sent by the HSS, the processing module 500 may add the identification information (the Indication 2) to the authentication request message set by the HSS, and send, to the UE-R by using the sending module 600, the authentication request message that includes the Indication 2 and the authentication vector (a RAND and an AUTN) that is set by the HSS. Specifically, the sending module 600 may send the authentication request message that includes the Indication 2, the AUTN, and the RAND to the UE-R, so as to inform, by using the Indication 2, that the authentication request message is a request message for authenticating on the UE.

In some feasible implementation manners, after the sending module 600 of the MME sends the authentication request message for authenticating on the UE to the UE-R, the UE-R may send, according to the authentication request message, an authentication request message to the UE, and send, to the UE, the information such as the RAND and AUTN set by the HSS. The UE may perform verification on an authentication parameter included in the authentication vector in the authentication request message, compute a parameter RES, and further send the RES parameter to the UE-R by using an authentication response. After receiving the authentication response message sent by the UE, the UE-R may send the authentication response message that includes the RES parameter to the MME. After receiving the authentication response message, the MME may compare the RES parameter in the authentication response message with a prestored XRES in the authentication vector sent by the HSS, to determine whether the RES and the XRES are consistent. If a result of the determining is yes, it may be determined that the UE is UE that is allowed to access a network, that is, authentication on the UE may be completed by using the authentication request of the UE.

The control network element (the MME) described in this embodiment of the present invention may determine, according to a second request message sent by a UE-R, whether the second request message includes identification information for authenticating on UE or whether a message type of the second request message is a specified message type, when the second request message includes the identification information for authenticating on the UE or the message type of the second request message is the specified message type, send an authentication data request message to an HSS, acquire, from the HSS, authentication identification information such as an authentication vector for authenticating on the UE, and further send an authentication request message that includes the authentication identification information to the UE-R, so as to send the authentication identification information to the UE by using the UE-R. The MME in this embodiment of the present invention may send the authentication data request message that includes identification information for authenticating on the UE to the HSS, or send the authentication request message that includes the authentication identification information to the UE-R, which can improve efficiency in authenticating the UE, reduce complexity and costs of terminals such as the UE-R and the UE, and improve user experience of authentication on the UE.

Figure 20:
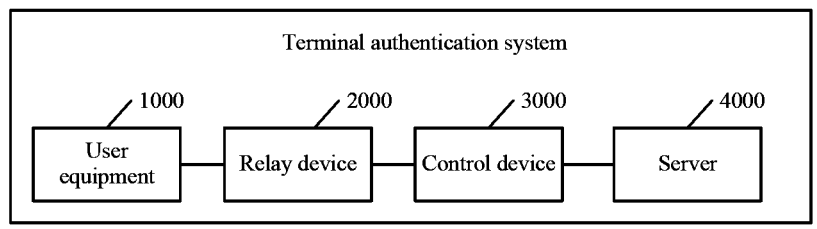
FIG. 20 is a schematic structural diagram of a terminal authentication system according to an embodiment of the present invention.

Referring to FIG. 20, FIG. 20 is a schematic structural diagram of an embodiment of a terminal authentication system according to an embodiment of the present invention. The terminal authentication system described in this embodiment includes: the foregoing terminal authentication user equipment 1000 provided in the embodiments of the present invention, the foregoing terminal authentication relay device 2000 provided in the embodiments of the present invention, the foregoing terminal authentication control device 3000 provided in the embodiments of the present invention, and the foregoing terminal authentication server 4000 provided in the embodiments of the present invention.

In specific implementation, for a specific implementation process of the foregoing terminal authentication system provided in the present disclosure, refer to a specific implementation process of the foregoing terminal authenticating method or apparatus (including the UE, the UE-R, the MME, and the HSS) provided in the embodiments of the present invention, and details are not described herein again.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), a random access memory (RAM), or the like.

What is disclosed above is merely exemplary embodiments of the present invention, and certainly is not intended to limit the protection scope of the present invention. Therefore, equivalent variations made in accordance with the claims of the present invention shall fall within the scope of the present disclosure.

What is claimed is:

1. A terminal authenticating method comprising:
receiving, by a UE-to-network relay (UE-R), a first request message sent by a user equipment (UE),
wherein the first request message comprises information for authenticating the UE, and
wherein the information comprises at least one of (a) an international mobile subscriber identity (IMSI) and (b) identification information indicating that the first request message is a request from the UE for accessing a network by using the UE-R;
determining, by the UE-R, whether the first request message received includes the identification information;
in response to the determining, adding, by the UE-R, the information to a second request message,
wherein the second request message is of the same message type as the first request message, when the first request message does not includes the identification information, and
wherein the second request message is a different message type as the first request message when the first request message includes the identification information;
sending, by the UE-R, the second request message to a control network element, causing the control network element to:
a) determine whether the second request message received is of a specified type, and
b) upon determining the second request message received is of a specified type, cooperate with a home subscriber server (HSS) to generate a first authentication request message that includes the identification information for authentication of the UE and not for authentication of the UE-R;
receiving, by the UE-R, the first authentication request message from the control network element;
determining, by the UE-R, whether the first authentication request message is requesting authentication of the UE or authentication the UE-R based on the identification information included in the first authentication request message;
sending, by the UE-R, a second authentication request message to the UE when the first authentication request message from the control network element is determined to be for authenticating the UE,
wherein the second authentication request message comprises an authentication parameter for authenticating the UE, and
wherein the authentication parameter is encrypted and based on an authentication vector message sourcing from the HSS according to the first request message sent by the UE to the UE-R;
receiving, by the UE-R, an authentication response message from the UE according to the second authentication request message sent by the UE-R; and
in response to receiving the authentication response message from the UE, sending the authentication response message to the control network element, so as to complete authentication of the UE by using the UE-R.

2. The method according to claim 1, wherein:
the first authentication request message sent by the control network element comprises authentication identification information for authenticating the UE and is set by the HSS for authenticating the UE; and
determining whether the first authentication request message is for authenticating the UE comprises:
determining whether the first authentication request message comprises the authentication identification information, and
determining that the first authentication request message is for authenticating the UE when the first authentication request message comprises the authentication identification information.

3. A terminal authenticating method comprising:
receiving, by a control network element, a second request message sent by a user equipment (UE) by way of a network relay (UE-R), wherein the second request message is:
(1) derived from a first request message sent by the UE to the UE-R, wherein the first request message comprises information for authenticating the UE, the information comprises at least one of: (a) an international mobile subscriber identity (IMSI) and (b) identification information indicating that the first request message is a request from the UE for accessing a network by using the UE-R; and
(2) same message type as the first request message, when the first request message does not include the identification information, or a different message type as the first request message, when the first request message includes the identification information;
in response to receiving the second request message, determining, by the control network element, that the second request message is of a specified type;
sending, by the control network element an authentication data request message to a home subscriber server (HSS) when the second request message comprises the identification information, wherein the authentication data request message carries the identification information;
acquiring, by the control network element, from the HSS, an authentication vector determined by the HSS according to the authentication data request message;
sending, by the control network element, to the UE-R an authentication request message that comprises information about the authentication vector, so that the UE-R determines whether the authentication request message is for authenticating the UE-R or for authenticating the UE, wherein:
the authentication request message sent by the control network element includes encrypted authentication identification information for authenticating the UE, and
the encrypted authentication identification information is set by the HSS according to the identification information; and
receiving, by the control network element, an authentication response message from the UE so as to complete authentication of the UE.

4. A terminal authentication relay device comprising:
a hardware processor;
a receiver configured to cooperate with the hardware processor to receive a first request message sent by a user equipment (UE), wherein the first request message comprises information for authenticating the UE,
wherein the information comprises at least one of (a) an international mobile subscriber identity (IMSI) and (b) identification information indicating that the first request message is a request from the UE for accessing a network by using the terminal authentication relay device (UE-R);
a transmitter configured to cooperate with the hardware processor to send a second request message to a control network element, causing the control network element to:
(a) determine whether the second request message received is of a specified type, and
b) upon determining the second request message received is of a specified type, cooperate with a home subscriber server (HSS) to generate an authentication request message that includes the identification information for authenticating the UE and not for authenticating the UE-R;
wherein the receiver is further configured to cooperate with the hardware processor to receive a first authentication request message from the control network element;
wherein the hardware processor is configured to:
determine whether the first request message received includes the identification information;
add the identification information to a second request message in response to determining the first request message received includes the identification information,
wherein the second request message is of same message type as the first request message, when the first request message does not includes the identification information, and
wherein the second request message is a different message type as the first request message when the first request message includes the identification information, and
determine whether the first authentication request message is for requesting authentication of the UE or authentication of the UE-R based on the identification information included in the first authentication request message,
wherein the transmitter is further configured to cooperate with the hardware processor to send a second authentication request message to the UE when the hardware processor determines that the first authentication request message is for authentication of the UE,
wherein the second authentication request message comprises an authentication parameter for authenticating the UE,
wherein the authentication parameter is encrypted and based on an authentication vector message sourcing from the HSS according to the first request message sent by the UE to the UE-R, and
wherein the authentication parameter is requested by the hardware processor from the HSS according to the first request message sent by the UE;
wherein the receiver is further configured to cooperate with the hardware processor to receive an authentication response message from the UE according to the second authentication request message sent by the transmitter; and
wherein the transmitter is further configured to cooperate with the hardware processor to send to the control network element the authentication response message received by the receiver, so as to complete authentication of the UE by using the UE-R.

5. A terminal authentication control device comprising:
a hardware processor;
a receiver configured to cooperate with the hardware processor to receive a second
request message sent by a user equipment (UE) by way of a network relay (UE-R), wherein the second request message (a) is:
(1) derived from a first request message sent by the UE to the UE-R, wherein the first request message comprises information for authenticating the UE, the information comprises at least one of: (a) an international mobile subscriber identity (IMSI) and (b) identification information indicating that the first request message is a request from the UE for accessing a network by using the UE-R; and
(2) same message type as the first request message, when the first request message does not include the identification information, or a different message type as the first request message, when the first request message includes the identification information;
the hardware processor configured to, in response to receiving the second request message, determine that the second request message is of a specified type;
a transmitter configured to cooperate with the hardware processor to send an authentication data request message to a home subscriber server (HSS) when the second request message comprises identification information,
wherein the authentication data request message carries the identification information, and
the receiver is further configured to cooperate with the hardware processor to acquire, from the HSS, an authentication vector determined by the HSS according to the authentication data request message;
the transmitter is further configured to cooperate with the hardware processor to send to the UE-R an authentication request message that comprises information about the authentication vector, so that the UE-R determines whether the authentication request message is for authenticating the UE or for authenticating the UE-R, wherein:
the authentication request message sent by the transmitter includes encrypted authentication identification information for authenticating the UE, and
the encrypted authentication identification information is set by the HSS according to the identification information; and
wherein the receiver is further configured to cooperate with the hardware processor to receive an authentication response message from the UE so as to complete authentication of the UE by using the processor.

6. A terminal authentication system comprising
a relay device (UE-R); a hardware server; a user equipment (UE) configured to send a first request message to the UE-R; and a control device;
wherein the UE-R is configured to send a second request message to the control device according to the first request message, wherein the second request message is derived from the first request message, wherein the second request message is:
(1) derived from the first request message sent by the UE to the UE-R, wherein the first request message comprises information for authenticating the UE, the information comprises at least one of: (a) an international mobile subscriber identity (IMSI) and (b) identification information indicating that the first request message is a request from the UE for accessing a network by using the UE-R, and (2) same message type as the first request message, when the first request message does not include the identification information, or a different message type as the first request message, when the first request message includes the identification information;

wherein the control device is configured to:
receive the second request message,
in response to receiving the second request message, determine that the second request message received is of a specified type,
send an authentication data request message to the hardware server when the second request message comprises the identification information,
wherein the authentication data request message carries the identification information;

wherein the hardware server is configured to:
receive the authentication data request message sent by the control device,
determine whether the authentication data request message comprises identification information,
set, in an authentication vector and according to the identification information for authenticating the UE, encrypted authentication identification information when the authentication data request message comprises the identification information, and
send, to the control device, the authentication vector;

wherein the control device is further configured to:
receive the encrypted authentication identification information and send a first authentication request message to the UE-R, wherein the first authentication request message sent by the control device includes the authentication identification information; and wherein the UE-R is further configured to:
determine, according to the authentication identification information,
whether the first authentication request message sent by the control device is for authenticating the user equipment or for authenticating the UE-R,
send a second authentication request message to the UE when it is determined that the first authentication request message is for authentication of the UE, wherein
the second authentication request message comprises an authentication parameter for implementing authentication of the UE, wherein the authentication parameter is based on an authentication vector message sourcing from the hardware server,
receive an authentication response message from the UE according to the authentication request message, and
send, to the control device, the authentication response message so as to complete authentication of the UE by using the control device.

* * * * *

UNITED STATES PATENT AND TRADEMARK OFFICE
CERTIFICATE OF CORRECTION

Page 1 of 1

PATENT NO. : 10,588,015 B2
APPLICATION NO. : 15/197381
DATED : March 10, 2020
INVENTOR(S) : Zhang et al.

It is certified that error appears in the above-identified patent and that said Letters Patent is hereby corrected as shown below:

In the Claims

Claim 5, Column 40, Line 9: "(a)" should be deleted.

Signed and Sealed this
Eighth Day of June, 2021

Drew Hirshfeld
*Performing the Functions and Duties of the
Under Secretary of Commerce for Intellectual Property and
Director of the United States Patent and Trademark Office*